United States Patent
Xiao et al.

(10) Patent No.: US 12,309,015 B2
(45) Date of Patent: May 20, 2025

(54) SYNCHRONIZATION SIGNAL TRANSMISSION

(71) Applicant: ZTE Corporation, Guangdong (CN)

(72) Inventors: Kai Xiao, Guangdong (CN); Xing Liu, Guangdong (CN); Peng Hao, Guangdong (CN); Feng Bi, Guangdong (CN); Wei Gou, Guangdong (CN)

(73) Assignee: ZTE Corporation, Guangdong (CN)

( * ) Notice: Subject to any disclaimer, the term of this patent is extended or adjusted under 35 U.S.C. 154(b) by 535 days.

(21) Appl. No.: 17/350,778

(22) Filed: Jun. 17, 2021

(65) Prior Publication Data
US 2021/0320832 A1    Oct. 14, 2021

Related U.S. Application Data

(63) Continuation of application No. PCT/CN2018/121905, filed on Dec. 19, 2018.

(51) Int. Cl.
*H04L 27/26* (2006.01)
*H04W 56/00* (2009.01)
*H04W 72/0446* (2023.01)

(52) U.S. Cl.
CPC .... *H04L 27/2656* (2013.01); *H04L 27/26025* (2021.01); *H04L 27/2607* (2013.01); *H04W 56/001* (2013.01); *H04W 72/0446* (2013.01)

(58) Field of Classification Search
CPC ........... H04L 27/2656; H04L 27/26025; H04L 27/2607; H04L 5/005; H04L 5/0053;
(Continued)

(56) References Cited

U.S. PATENT DOCUMENTS

2018/0262313 A1   9/2018   Nam et al.
2018/0324678 A1   11/2018  Chen et al.
(Continued)

FOREIGN PATENT DOCUMENTS

CN    108401533 A    8/2018
CN    108880606 A    11/2018
(Continued)

OTHER PUBLICATIONS

Co-Pending CN Application No. 2018801002481, Notification of Registration and Grant dated Mar. 31, 2023, 4 pages with unofficial translation.
(Continued)

*Primary Examiner* — Michael K Phillips
(74) *Attorney, Agent, or Firm* — Perkins Coie LLP

(57) ABSTRACT

Methods, apparatus, and systems for providing Synchronization Signal Block (SSB) mapping schemes are described. The techniques can be implemented in various embodiments to allow the transmission of SSB using higher spectrum frequencies. The techniques also take into account of various Cyclic Prefix (CP) lengths for compatibility concerns. In one example aspect, a wireless communication method is disclosed. The method includes mapping a synchronization signal block to multiple symbols having a first subcarrier spacing and generating a transmission pattern for a first time interval that includes the multiple symbols for the synchronization signal block. The multiple symbols are from a set of non-consecutive candidate symbol groups.

24 Claims, 21 Drawing Sheets

(58) Field of Classification Search
CPC ... H04L 5/0064; H04L 5/0094; H04L 5/0007; H04L 5/0048; H04L 5/0078; H04W 56/001; H04W 72/0446; Y02D 30/70

See application file for complete search history.

(56) References Cited

U.S. PATENT DOCUMENTS

| | | | |
|---|---|---|---|
| 2018/0338308 A1 | 11/2018 | Park et al. | |
| 2019/0098590 A1* | 3/2019 | Nam | H04W 72/23 |
| 2019/0140776 A1* | 5/2019 | Seo | H04B 7/0456 |
| 2019/0191457 A1* | 6/2019 | Si | H04L 5/0078 |
| 2019/0306832 A1* | 10/2019 | Si | H04J 11/0069 |
| 2020/0267697 A1* | 8/2020 | Liu | H04W 56/001 |
| 2020/0344792 A1* | 10/2020 | Liu | H04W 72/23 |
| 2021/0037488 A1* | 2/2021 | Ko | H04W 56/001 |
| 2021/0045144 A1* | 2/2021 | Kim | H04L 5/005 |
| 2021/0176755 A1 | 6/2021 | Liu | |
| 2021/0314910 A1* | 10/2021 | Rune | H04L 5/0094 |

FOREIGN PATENT DOCUMENTS

| | | |
|---|---|---|
| EP | 3684120 A1 | 7/2020 |
| EP | 3694283 A1 | 8/2020 |
| KR | 10-1915997 B1 | 11/2018 |
| WO | 2018/174606 | 9/2018 |
| WO | 2018/203708 A1 | 11/2018 |

OTHER PUBLICATIONS

International Search Report and Written Opinion mailed on Sep. 18, 2019 for International Application No. PCT/CN2018/121905, filed on Dec. 19, 2018 (6 pages).

Co-Pending CN Application No. 2018801002481, First Office Action dated Oct. 17, 2022, 32 pages with unofficial translation.

Vivo "Discussion on remaining details on synchronization signal" 3GPP TSG RAN WG1 Meeting #91 R1-1719756, Reno, USA, Nov. 27-Dec. 1, 2017, 7 pages.

CIPO, Notice of Allowance for Canadian Application No. 3,124,306, mailed on Aug. 22, 2023, 1 page.

European Search Report for EP Patent Application No. 18930135.1, dated Dec. 8, 2021, 14 pages.

CATT, "Summary of Offline Discussion on Remaining Minimum System Information," 3GPP TSG RAN WG1 Meeting 91, R1-171605, Revision of R1-1721554, Reno, USA, Nov. 27-Dec. 1, 2017, 27 pages.

Samsung, "Remaining Details on RMSI," 3GPP TSG RAN WG1#91, R1-1720274, Reno, USA, Nov. 27-Dec. 1, 2017, 19 pages.

Nokia, et al., "Remaining details on NR-PBCH," 3GPP TSG-RAN WG1 NR AH#3, R1-1716524, Nagoya, Japan, Sep. 18-21, 2017, 13 pages.

Co-Pending KR Application No. 10-2021-7022639, Office Action dated Apr. 25, 2024, 6 pages with unofficial English summary.

ZTE "Multiple SS blocks in wideband CC" 3GPP TSG RAN WG1 Meeting #90 R1-1712058, Prague, Czechia, Aug. 21-25, 2017, 5 Pages.

Intel Corporation "SS Burst Set Composition" 3GPP TSG RAN WG1 NR Ad-Hoc#2 R1-1710502, Qingdao, P.R. China Jun. 27-30, 2017, 7 pages.

Co-Pending KR Application No. 10-2021-7022639, $2^{nd}$ Office Action dated Dec. 19, 2024, 8 pages with machine translation.

CATT, "Summary of Offline Discussion on RMSI" 3GPP TSG RAN WG1 Meeting #92 R1-1801710, Athens, Greece, Feb. 26-Mar. 2, 2018, 18 pages.

3GPP "Technical Specification Group Radio Access Network" Physical layer procedures for control (Release 15), 3GPP TS 38.213 V15.3.0 (Sep. 2018), 101 pages.

Huawei, "Correction on RMSI configurations" 3GPP TSG RAN WG1 Ad Hoc Meeting R1-1800030, Vancouver, Canada, Jan. 22-26, 2018. 14 pages.

\* cited by examiner

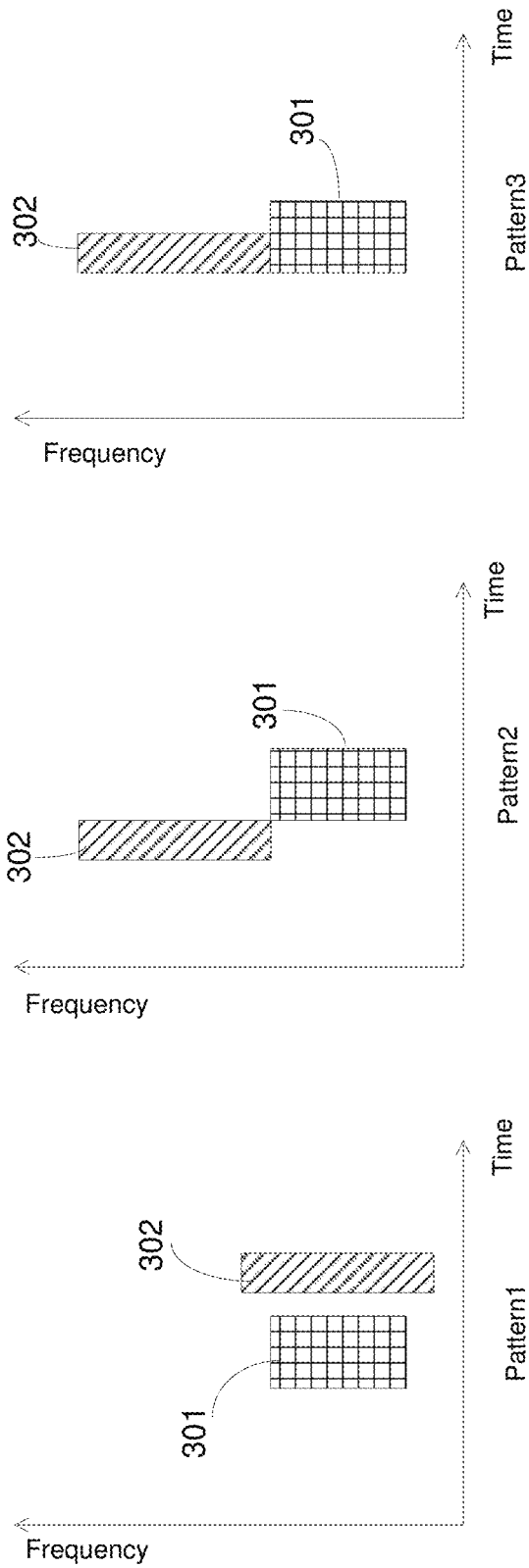

SYNCHRONIZATION SIGNAL TRANSMISSION

CROSS-REFERENCE TO RELATED APPLICATIONS

This application is a continuation of International Patent Application No. PCT/CN2018/121905, filed on Dec. 19, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for providing Synchronization Signal Block (SSB) mapping schemes that allow the transmission of SSB using higher spectrum frequencies. The techniques also take into account of various Cyclic Prefix (CP) lengths for compatibility concerns. This patent document further describes the correspondence between SSBs and Control Resource Sets (CORESETs) such that the multiplexing of SSBs and CORESETs can be supported without additional cost.

In one example aspect, a wireless communication method is disclosed. The method includes mapping a synchronization signal block to multiple symbols having a first subcarrier spacing and generating a transmission pattern for a first time interval that includes the multiple symbols for the synchronization signal block. The multiple symbols are from a set of non-consecutive candidate symbol groups.

In another example aspect, a wireless communication method is disclosed. The method includes mapping synchronization data onto multiple synchronization symbol blocks within a first time interval having a first subcarrier spacing and generating a transmission pattern for the first time interval. Each synchronization symbol block has a one-to-one correspondence with each set of multiple control resource sets, and the multiple control resource sets are mapped to a second time interval having a second subcarrier spacing.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 3A shows an example pattern structure of Pattern1.

FIG. 3B shows an example pattern structure of Pattern2.

FIG. 3C shows an example pattern structure of Pattern 3.

DETAILED DESCRIPTION

Figure 1B:
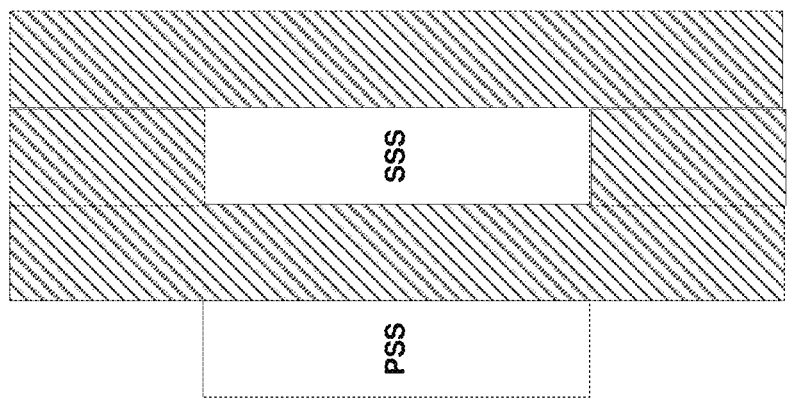
FIG. 1B shows another example configuration of the PSS, the SSS, and the PBCH in an SSB.

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

With the continuous advance of communication technologies, the types of applications of wireless communication services are becoming more and more abundant. For example, Enhanced Mobile Broadband (eMBB), Ultra-Reliable and Low Latency Communication (URLLC), and Massive Machine Type of Communication (MMTC) have been adopted as the three main application scenarios in the 5G wireless systems. The 5G systems now support more flexible configurations of transmission cells and use spectrum resources at higher frequency bands, thereby improving the spectrum efficiency by 3 to 5 times as compared with existing 4G systems.

In the 4G era, the spectrum of Long-Term Evolution (LTE) systems is generally below 3 GHz, and the subcarrier spacing remains fixed at 15 KHz. In the 5G era, New Radio (NR) communication systems have two segments in the open spectrum: frequency range 1 (FR1) in the range of 450 MHz-6 GHz, and frequency range 2 (FR2) in the range of 24.25 GHz-52.6 GHz. It is also foreseeable that the frequency spectrum higher than FR2 can be adopted in the near future. With the use of higher frequencies, the data channels need to support larger subcarrier spacings (SCS).

Various subcarrier spacings of data channels also brings compatibility problems. When the SCS becomes large, the length of the symbol and the length of the CP are reduced accordingly. The maximum subcarrier spacing in the current protocol is 240 kHz, with a corresponding symbol length of 4.17 microseconds and a Cyclic prefix (CP) of 0.29 microseconds. When the CP becomes too short, it cannot fully protect against inter-symbol interference, and the difficulty of symbol detection also increases. Extended CP (ECP) has been proposed to address this issue.

Currently, an SSB includes four symbols in the time domain. A PSS and an SSS respectively occupy one symbol, and the PBCH takes two symbols. The SSB includes 20 consecutive Resource Blocks (RBs) in the frequency domain, and there are five configurations in the time domain. Currently there is no standard defining how the SSBs should be mapped to resources having different subcarrier spacings. Also, under the current standard, data channels cannot have subcarrier spacing larger than 120 kHz, which limits the utility of higher frequency spectrum.

Due to the lack of considerations of different subcarrier spacings, the current SSB mapping schemes provide poor compatibility among various combinations of subcarrier spacings. The current SSB mapping schemes also fail to provide compatibility when both normal CP (NCP) and extended CP (ECP) are in use. Finally, the correspondence between SSBs of 15 and 30 kHz and the control resource set are not explicitly indicated in FR1. Thus, the Physical downlink control channel Monitor Occasion (PMO) needs to be examined to support the multiplexing of SSBs and control resource sets.

This patent documents discloses techniques that can be implemented in various embodiments to provide SSB mappings that support different subcarrier spacings. The mappings also take into account the difference between NCP and ECP, thereby providing additional compatibility when both NCP and ECP are used for different subcarrier spacings. This patent document further describes the correspondence between SSBs and the control resource sets so that multiplexing of SSBs and control resource sets can be supported without additional cost.

Overview

Figure 1A:
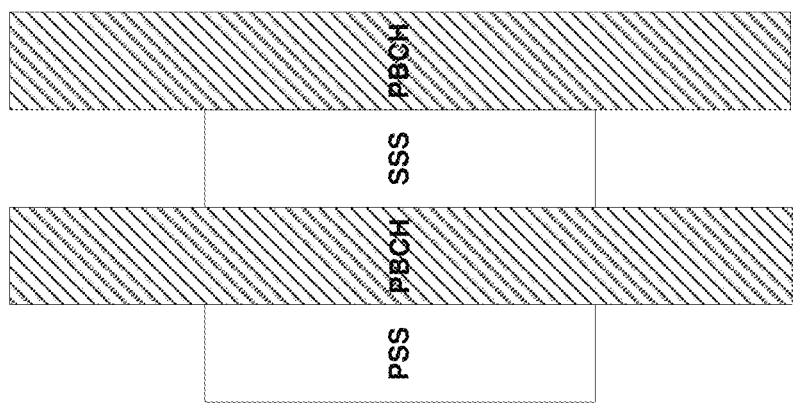
FIG. 1A shows an example configuration of the primary synchronization signal (PSS), the secondary synchronization signal (SSS), and the physical broadcast channel (PBCH) in a Synchronization Signal Block (SSB).

The Synchronization Signal Block is used to carry time-frequency resources for gaining access to the channel, including the synchronization signal, the PBCH, and the corresponding demodulation reference signal (DMRS). FIGS. 1A-B illustrations example configurations of the synchronization signal block. Currently, the SSB includes four symbols. The PSS and the SSS are carried on the first and third symbols respectively. The synchronization signal sequences are mapped on 127 resource units (REs) in 12 physical resource blocks (PRBs). In some configurations, such as shown in FIG. 1A, the PBCH is only carried on the second and fourth symbols in the SSB, occupies 24 PRBs. In some configurations, as shown in FIG. 1B, the PBCH is mapped on the second, third, and fourth symbols in the SSB.

In these configurations, the sync signal is aligned with the center frequency of the PBCH.

As the communication systems advance, the SSB can also be extended to include more time-domain symbols to carry more broadcast information. For example, future communication systems can use more than four time-domain symbols for each SSB. The added symbol can be inserted anywhere in the existing 4-symbol SSB structure.

Figure 2A:
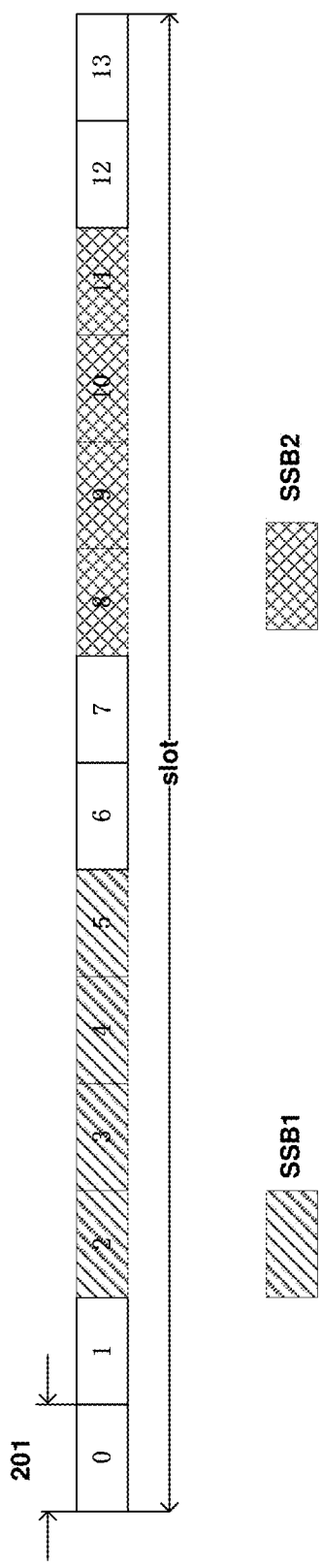
FIG. 2A shows an example mapping of an SSB for a 15 kHz subcarrier spacing.

The mapping of the SSB can be different for different subcarrier spacings. Here are five possible mappings:

Case A: FIG. 2A shows an example mapping of an SSB for a 15 kHz subcarrier spacing. Using the normal CP, each slot includes 14 symbols 201. Two SSBs are mapped to one slot, each occupying four symbols. The first SSB (SSB1) occupies symbols 2 to 5, while the second SSB (SSB2) occupies symbols 8 to 11.

Figure 2B:
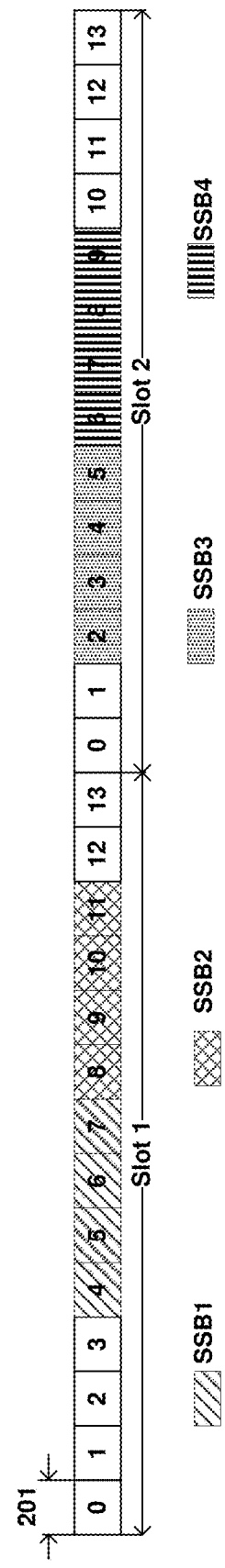
FIG. 2B shows an example mapping of an SSB for a 30 kHz subcarrier spacing.

Case B: FIG. 2B shows an example mapping of an SSB for a 30 kHz subcarrier spacing. Using the normal CP, each slot includes 14 symbols 201. Four SSBs are mapped to two slots, each occupying four symbols. The first SSB (SSB1) occupies symbols 4 to 7 in slot 1, the second SSB (SSB2) occupies symbols 8 to 11 in slot 1, the third SSB (SSB3) occupies symbols 2 to 5 in slot 2, and the fourth SSB (SSB4) occupies symbols 6 to 9 in slot 2.

Figure 2C:
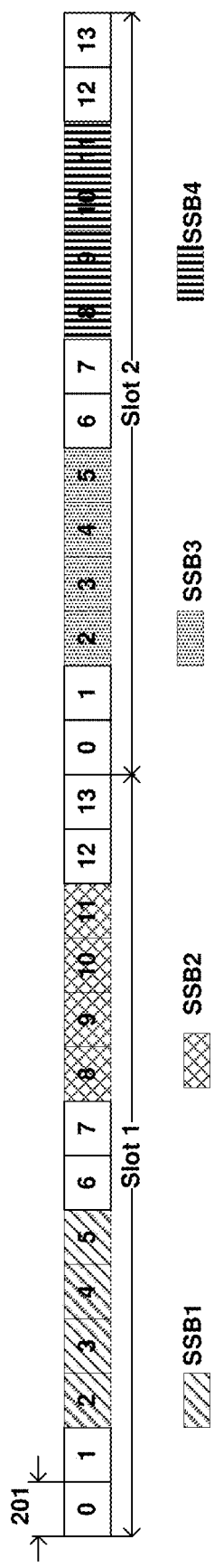
FIG. 2C shows another example mapping of an SSB for a 30 kHz subcarrier spacing.

Case C: FIG. 2C shows another example mapping of an SSB for a 30 kHz subcarrier spacing. Using the normal CP, each slot includes 14 symbols 201. Four SSBs are mapped to two slots, each occupying four symbols. The first SSB (SSB1) occupies symbols 2 to 5 in slot 1, the second SSB (SSB2) occupies symbols 8 to 11 in slot 1, the third SSB (SSB3) occupies symbols 2 to 5 in slot 2, and the fourth SSB (SSB4) occupies symbols 8 to 11 in slot 2.

Figure 2D:
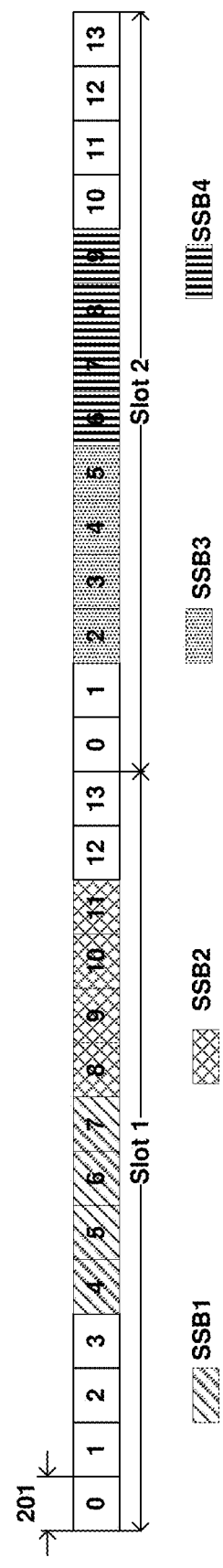
FIG. 2D shows an example mapping of an SSB for a 120 kHz subcarrier spacing.

Case D: FIG. 2D shows an example mapping of an SSB for a 120 kHz subcarrier spacing. Using the normal CP, each slot includes 14 symbols 201. Four SSBs are mapped to two slots, each occupying four symbols. The first SSB (SSB1) occupies symbols 4 to 7 in slot 1, the second SSB (SSB2) occupies symbols 8 to 11 in slot 1, the third SSB (SSB3) occupies symbols 2 to 5 in slot 2, and the fourth SSB (SSB4) occupies symbols 6 to 9 in slot 2.

Figure 2E:
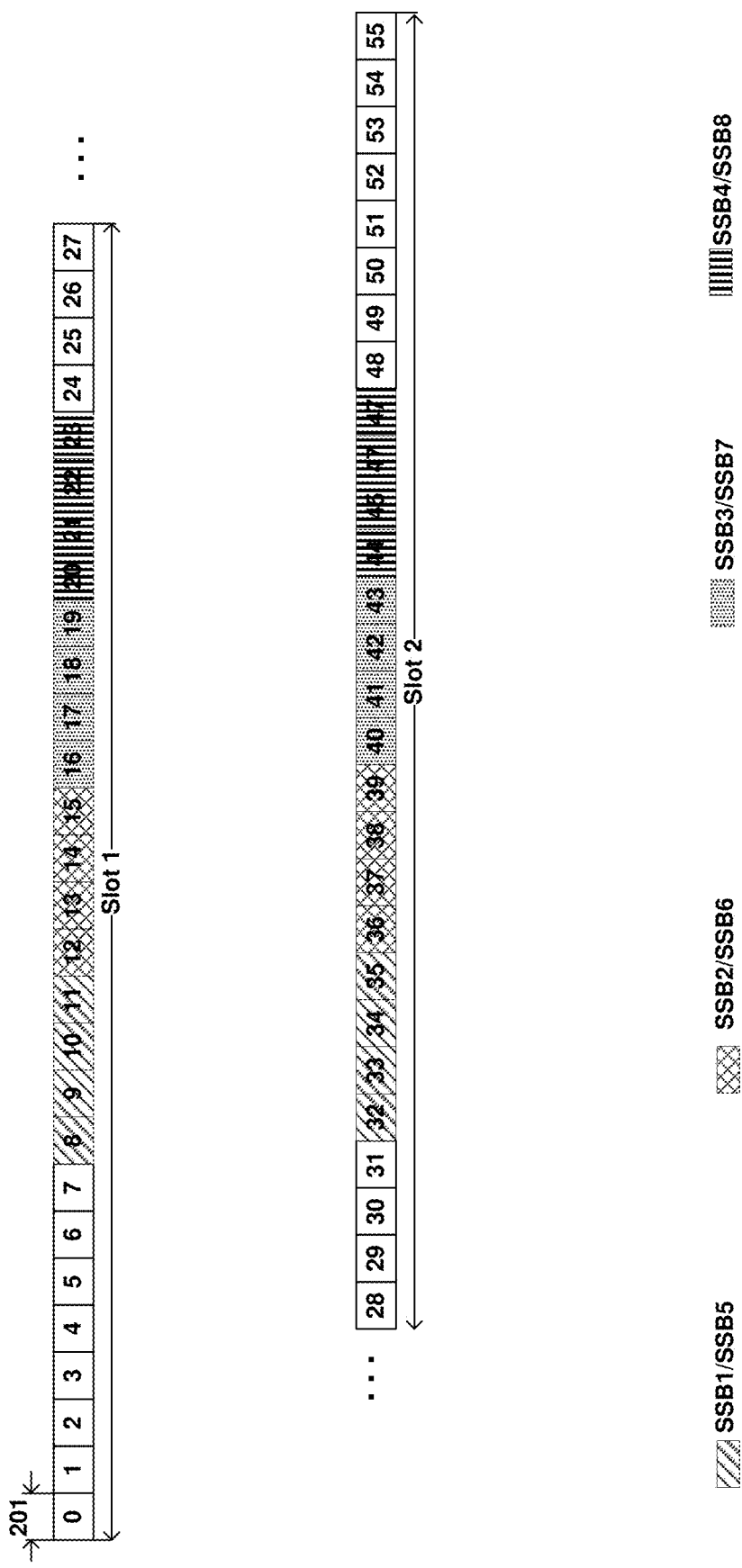
FIG. 2E shows an example mapping of an SSB for a 240 kHz subcarrier spacing.

Case E: FIG. 2E shows an example mapping of an SSB for a 240 kHz subcarrier spacing. Using the normal CP, each slot includes 14 symbols 201. Eight SSBs are mapped to two slots, each occupying four symbols. In slot 1, the first SSB (SSB1) occupies symbols 8 to 11, the second SSB (SSB2) occupies symbols 12 to 15, the third SSB (SSB3) occupies symbols 16 to 19, and the fourth SSB (SSB4) occupies symbols 20 to 23. In slot 2, the fifth SSB (SSB5) occupies symbols 32 to 35, the sixth SSB (SSB6) occupies symbols 36 to 39, the seventh SSB (SSB7) occupies symbols 40 to 43, and the eighth SSB (SSB8) occupies symbols 44 to 47.

Furthermore, there are three types of SSB and control resource set multiplexing modes, namely Pattern1, Pattern2 and Pattern3

Pattern1: FIG. 3A shows an example pattern structure of Pattern1. In Pattern1, the SSB 301 and Remaining Minimum System Information (RMSI) 302 are mapped in time-domain locations. The center frequency points of the SSB 301 and the RMSI 302 are aligned in the frequency domain.

Pattern2: FIG. 3B shows an example pattern structure of Pattern2. In Pattern2, the SSB 301 and RMSI 302 are mapped in the different time-domain locations. They are also multiplexed in the frequency domain. The SSB 301 and the RMSI 302 are placed "as close as possible" in the frequency domain, and there exists a 0-2 RB guard interval between the two.

Pattern3: FIG. 3C shows an example pattern structure of Pattern 3. In Pattern 3, the SSB 301 and the RMSI 302 are mapped in different frequency-domain locations, with the same starting position in the time domain. The SSB 301 and the RMSI 302 are placed "as close as possible" in the frequency domain without adding any guard intervals due to difference subcarrier spacings.

To allow compatibility among multiple subcarrier spacings as well as different CP lengths, the mapping of SSB needs to consider the control symbols and guard periods of the frames. For example, an SSB is mapped to multiple symbols a first time interval (e.g., half a radio frame, a radio frame, or multiple radio frames) having a first subcarrier spacing. Symbols in the first time interval have a first cyclic prefix length. The multiple symbols of the SSB are from a set of non-consecutive candidate symbol groups. The set of non-consecutive candidate symbol groups excludes control symbols and guard periods of the first time interval. The symbols in the set of non-consecutive candidate symbol groups are non-overlapping with control symbols and guard periods of a second time interval (e.g., half a radio frame, a radio frame, or multiple radio frames). The second time interval may have a different subcarrier spacing. The second time interval may also have a different cyclic prefix length.

Figure 4:
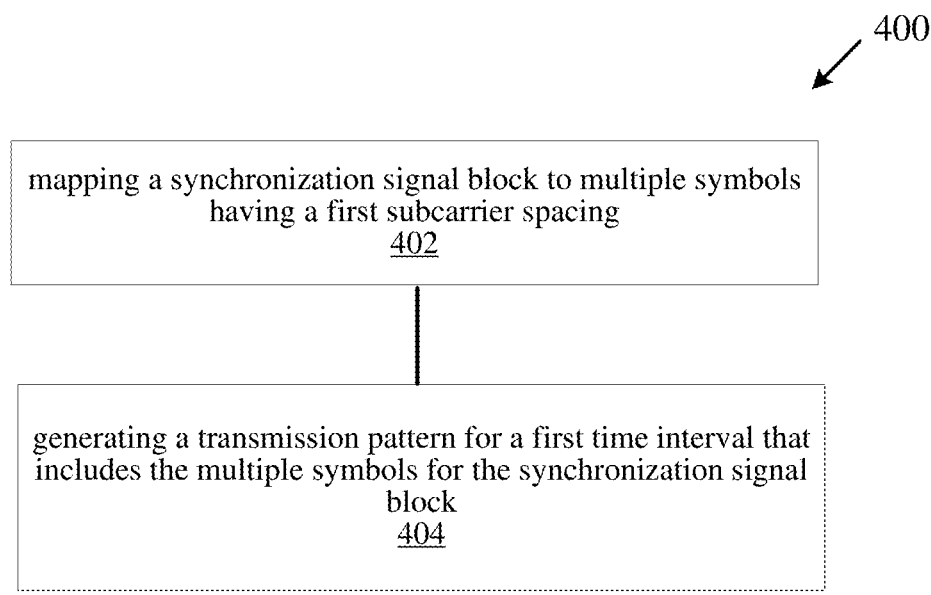
FIG. 4 is a flowchart representation of a wireless communication method in accordance with one or more embodiments of the disclosed technology.

FIG. 4 is a flowchart representation of a wireless communication method 400 in accordance with one or more embodiments of the disclosed technology. The method 400 includes, at 402, mapping a synchronization signal block to multiple symbols having a first subcarrier spacing. The multiple symbols are from a set of non-consecutive candidate symbol groups. The method 400 includes, at 404, generating a transmission pattern for a first time interval that includes the multiple symbols for the synchronization signal block. The symbols include but are not limited to Orthogonal Frequency-Division Multiplexing (OFDM) symbols.

Figure 5:
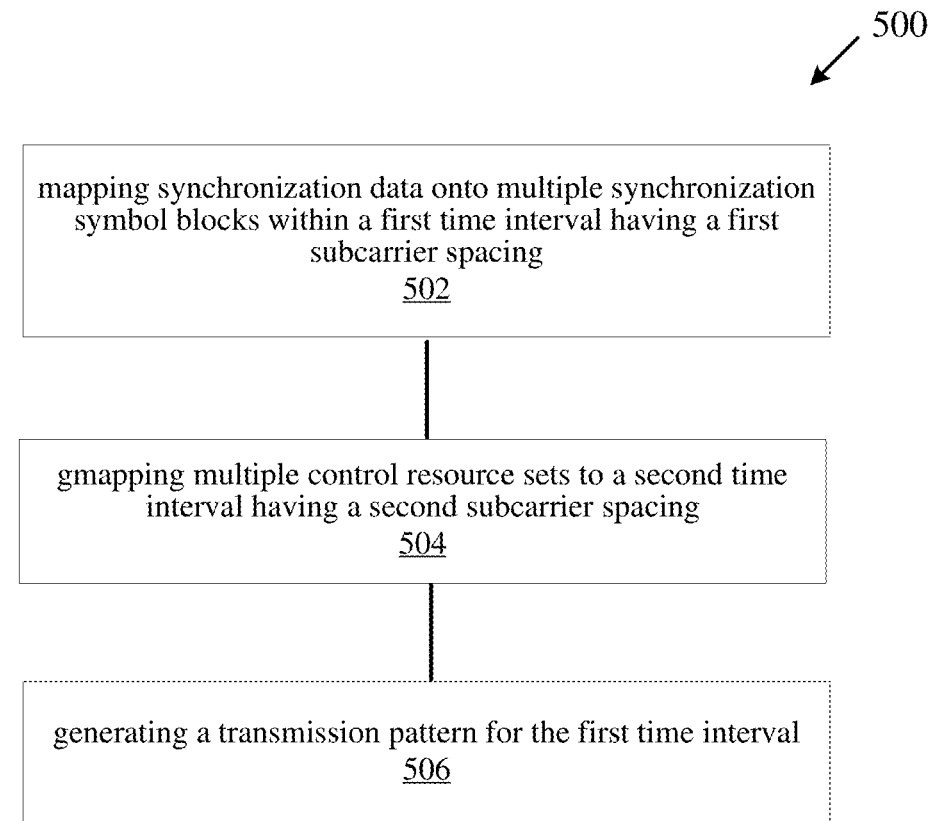
FIG. 5 is a flowchart representation of another wireless communication method in accordance with one or more embodiments of the disclosed technology.

FIG. 5 is a flowchart representation of a wireless communication method 500. The method 500 includes, at 502, mapping synchronization data onto multiple synchronization symbol blocks within a first time interval having a first subcarrier spacing. The method 500 includes, at 504, mapping multiple control resource sets to a second time interval having a second subcarrier spacing. The multiple control resource sets are configured according to a control resource set period that includes one or more slots, and each synchronization symbol block has a one-to-one correspondence with each set of the multiple control resource sets. The method 500 includes, at 506, generating a transmission pattern for the first time interval and the second time interval.

Some examples of the disclosed techniques are described in the following example embodiments.

Embodiment 1

This embodiment describes an example of SSB mapping with a SCS of 120 kHz using NCP. Each slot includes 14 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 6:
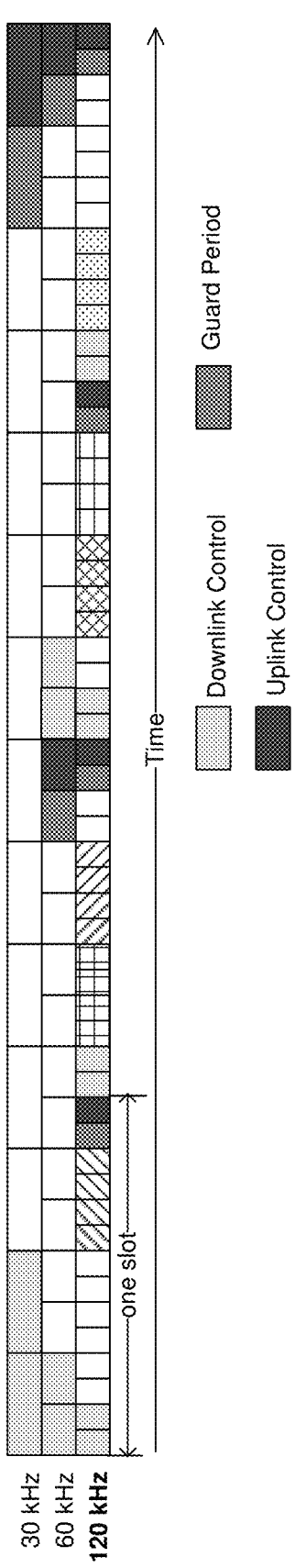
FIG. 6 shows an example mapping of the SSBs with a subcarrier spacing of 120 kHz in a period of t=0.5 milliseconds in accordance with one or more embodiments of the disclosed technology.

FIG. 6 shows an example mapping of the SSBs with a subcarrier spacing of 120 kHz in a period of t=0.5 milliseconds in accordance with one or more embodiments of the disclosed technology. One radio frame as a length of 2×T=10 ms (that is, T=5 ms). When the subcarrier spacing is 120 kHz, the length of a slot is 0.125 ms. The length of a slot is 0.25 ms for subcarrier spacing of 60 kHz, and 0.5 ms for subcarrier spacing of 30 kHz. To account for the impact of different subcarrier spacings, the mapping of the SSBs needs to avoid the downlink/uplink control symbols as well as the guard periods of symbols having other subcarrier spacings.

In this embodiment, one or more SSB can be selected from multiple SSB groups, each group having multiple symbols (e.g., four symbols) to map SSB. The subcarrier spacing is $\Delta f=2^\mu \cdot 15$ kHz, where $\mu$ is a non-negative integer. The first OFDM symbol each candidate SSB group has a symbol index of $\{8, 16, 20, 32, 36, 44\}+n\times56$, where n=$\{0, 1, \ldots, k-1\}$. In some embodiments, n can be a subset of non-negative integers selected from $\{0, 1, \ldots, k-1\}$. Here, $$k = \frac{T}{t}.$$

For subcarrier spacing of 120 kHz, k=10. That is, each half radio frame has 10 half-subframe that includes 4 slots (56 symbols). The symbol index of the first OFDM symbol in each candidate SSB group is organized based on the half-subframes.

Such design can support the time division multiplexing and coexistence of the control channel with the subcarrier spacing of 120 kHz and the control channel with the subcarrier spacing of 30 kHz, 60 kHz, and 120 kHz. In some embodiments, similar design can support SSBs such as 60 kHz, 240 kHz, 480 kHz, and 960 kHz in addition to supporting SSBs with an SCS of 120 kHz. For example, when $n_{scs}$=240 kHz, the design can be applied to support time division multiplexing and coexistence of control channels with SCS of 240 kHz and control channels with subcarrier spacing of 120 kHz, 240 kHz and 480 kHz. As another example, when $n_{scs}$=480 kHz, the design can be applied to support time division multiplexing and coexistence of control channels with SCS of 480 kHz and control channels with subcarrier spacing of 240 kHz, 480 kHz, and 960 kHz. In yet another example, when $n_{scs}$=960 kHz, the design can be applied to support time division multiplexing and coexistence of control channels with SCS of 960 kHz and control channels with subcarrier spacing of 480 kHz, 960 kHz, and 1820 kHz.

Embodiment 2

This embodiment describes an example of SSB mapping with a SCS of 120 kHz using NCP. Each slot includes 14 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 7:
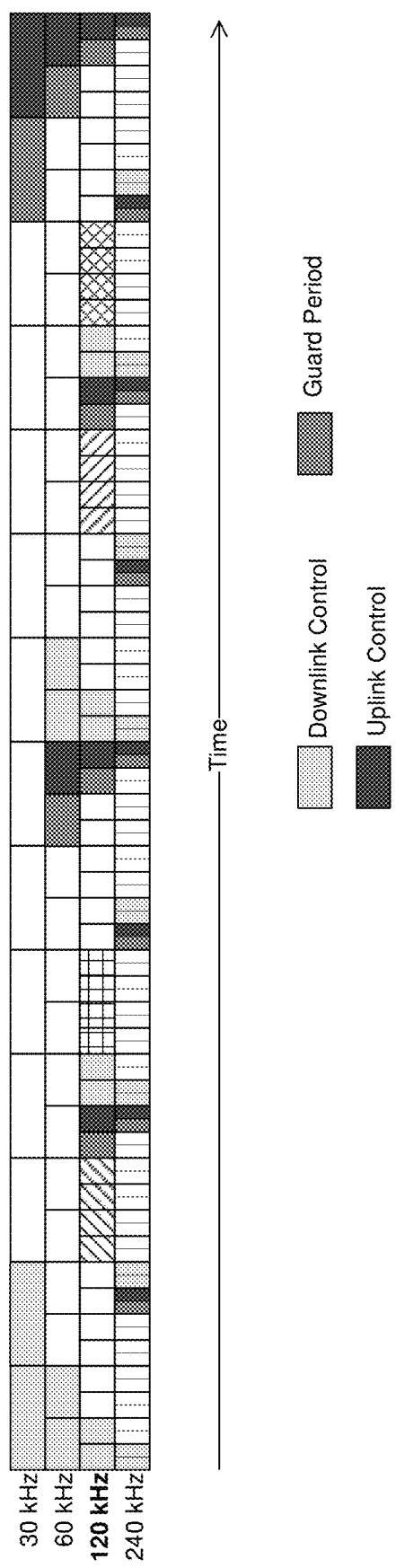
FIG. 7 shows an example mapping of the SSBs with a subcarrier spacing of 120 kHz in a period of t=0.5 milliseconds in accordance with one or more embodiments of the disclosed technology.

FIG. 7 shows an example mapping of the SSBs with a subcarrier spacing of 120 kHz in a period of t=0.5 milliseconds in accordance with one or more embodiments of the disclosed technology. One radio frame as a length of 2×T=10 ms (that is, T=5 ms). When the subcarrier spacing is 120 kHz, the length of a slot is 0.125 ms. The length of a slot is 0.0625 ms for subcarrier spacing of 240 kHz, 0.25 ms for subcarrier spacing of 60 kHz, and 0.5 ms for subcarrier spacing of 30 kHz. To account for the impact of different subcarrier spacings, the mapping of the SSBs needs to avoid the downlink/uplink control symbols as well as the guard periods of symbols having other subcarrier spacings.

In this embodiment, one or more SSB can be selected from multiple SSB groups, each group having multiple symbols (e.g., four symbols) to map SSB. The subcarrier spacing is $\Delta f=2^\mu \cdot 15$ kHz, where $\mu$ is a positive integer. The first OFDM symbol each candidate SSB group has a symbol index of $\{8, 16, 36, 44\}+n\times56$, where n=$\{0, 1, \ldots, k-1\}$. In some embodiments n can be a subset of non-negative integers selected from $\{0, 1, \ldots, k-1\}$. Here, $$k = \frac{T}{t} \times \left(\frac{n_{scs}}{120}\right).$$

For subcarrier spacing of 120 kHz, $n_{scs}$=120, and k=10. That is, each half radio frame has 10 half-subframes, each including 4 slots (56 symbols). The symbol index of the first OFDM symbol in each candidate SSB group is organized based on the half-subframes.

Such design can support the time division multiplexing and coexistence of the control channel with the subcarrier spacing of 120 kHz and the control channel with the subcarrier spacing of 30 kHz, 60 kHz, 120 kHz, and 240 kHz. In some embodiments, similar design can support SSBs such as 60 kHz, 240 kHz, 480 kHz, and 960 kHz in addition to supporting SSBs with an SCS of 120 kHz. For example, when $n_{scs}$=240 kHz, the design can be applied to support time division multiplexing and coexistence of control channels with SCS of 240 kHz and control channels with subcarrier spacing of 60 kHz, 120 kHz, 240 kHz and 480 kHz. As another example, when $n_{scs}$=480 kHz, the design can be applied to support time division multiplexing and coexistence of control channels with SCS of 480 kHz and control channels with subcarrier spacing of 120 kHz, 240 kHz, 480 kHz, and 960 kHz. In yet another example, when $n_{scs}$=960 kHz, the design can be applied to support time division multiplexing and coexistence of control channels with SCS of 960 kHz and control channels with subcarrier spacing of 240 kHz, 480 kHz, 960 kHz, and 1820 kHz.

Embodiment 3

This embodiment describes an example of SSB mapping with a SCS of 120 kHz using ECP. In this example, the symbols have two different lengths. Using NCP, each slot includes 14 symbols (e.g., OFDM symbols). Using ECP, each slot includes 12 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 8:
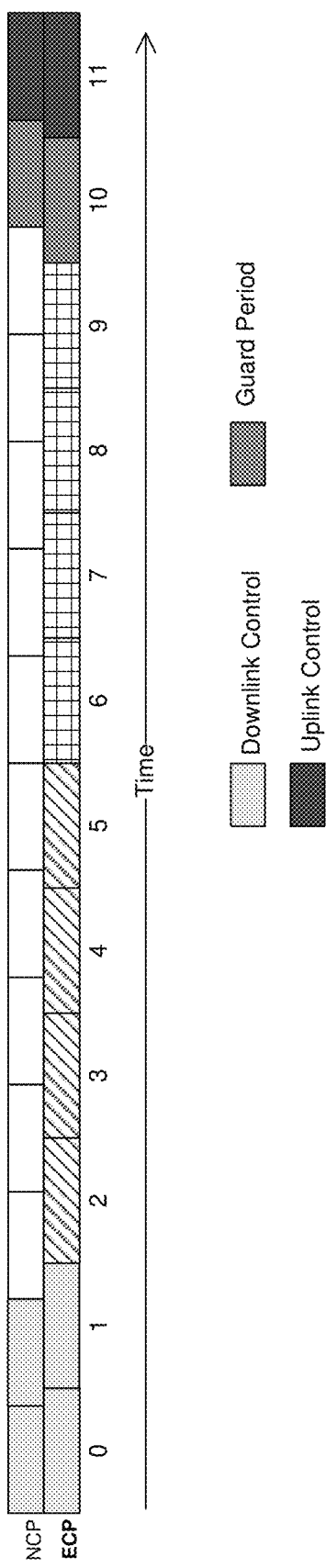
FIG. 8 shows an example mapping of the SSBs with a subcarrier spacing of 120 kHz in a period of t=0.125 milliseconds in accordance with one or more embodiments of the disclosed technology.

FIG. 8 shows an example mapping of the SSBs with a subcarrier spacing of 120 kHz in a period of t=0.125 milliseconds in accordance with one or more embodiments of the disclosed technology. One radio frame as a length of 2×T=10 ms (that is, T=5 ms). When the subcarrier spacing is 120 kHz, the length of a slot is 0.125 ms. To account for the impact of different subcarrier spacings, the mapping of the SSBs to symbols using ECP needs to avoid the downlink/uplink control symbols as well as the guard periods of symbols using NCP.

In this embodiment, one or more SSB can be selected from multiple SSB groups, each group having multiple symbols (e.g., four symbols) to map SSB. The subcarrier spacing is $\Delta f=2^\mu \cdot 15$ kHz, where $\mu$ is a positive integer. The first OFDM symbol each candidate SSB group has a symbol index of {2, 6}+n×12, where n={0, 1, ..., k–1}. In some embodiments, n can be a subset of non-negative integers selected from {0, 1, ..., k–1}. Here, $$k = \frac{T}{t} \times \left(\frac{n_{scs}}{120}\right).$$

For subcarrier spacing of 120 kHz, $n_{scs}$=120, and k=40. That is, each half radio frame using ECP has 40 slots, each having 12 symbols. The symbol index of the first OFDM symbol in each candidate SSB group is organized based on the slots.

Such design can support the time division multiplexing and coexistence of the control channel with the subcarrier spacing of 120 kHz using NCP and ECP. In some embodiments, similar design can support SSBs such as 60 kHz, 240 kHz, 480 kHz, and 960 kHz in addition to supporting SSBs with an SCS of 120 kHz using both NCP and ECP.

Embodiment 4

This embodiment describes an example of SSB mapping with a SCS of 120 kHz using ECP. The data channel described in this embodiment has three types of structures: the first SCS is 60 kHz with NCP so that each slot includes 14 symbols (e.g., OFDM symbols), the second SCS is 120 kHz with NCP so that each slot includes 14 symbols (e.g., OFDM symbols), and the third SCS is 120 kHz with ECP so that each slot includes 12 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 9:
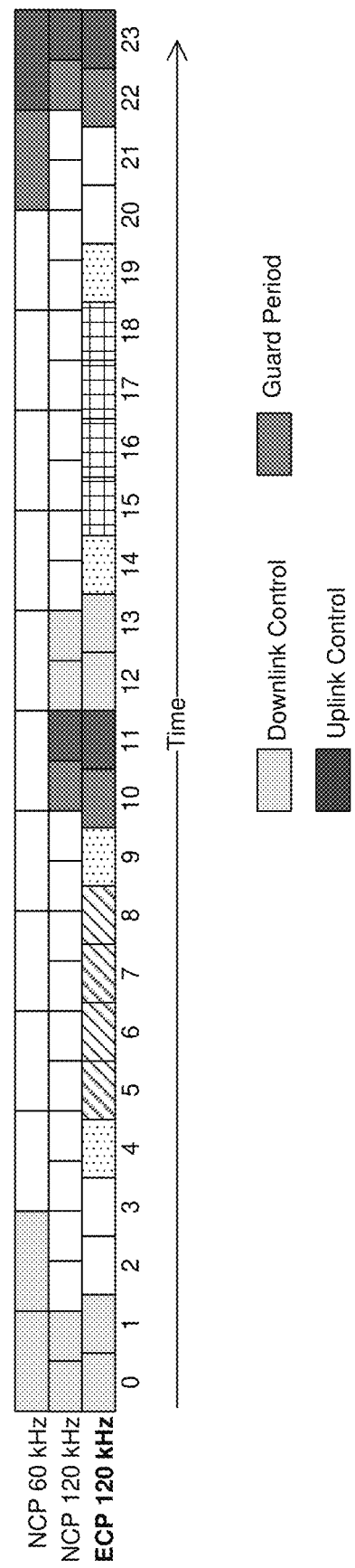
FIG. 9 shows an example mapping of the SSBs with a subcarrier spacing of 120 kHz in a period of t=0.25 milliseconds in accordance with one or more embodiments of the disclosed technology.

FIG. 9 shows an example mapping of the SSBs with a subcarrier spacing of 120 kHz in a period of t=0.25 milliseconds in accordance with one or more embodiments of the disclosed technology. One radio frame as a length of 2×T=10 ms (that is, T=5 ms). When the subcarrier spacing is 120 kHz, the length of a slot is 0.125 ms. To account for the impact of different subcarrier spacings, the mapping of the SSBs needs to avoid the downlink/uplink control symbols as well as the guard periods of symbols having other subcarrier spacings. The mapping of the SSBs to symbols using ECP also needs to avoid the downlink/uplink control symbols as well as the guard periods of symbols using NCP.

In this embodiment, one or more SSB can be selected from multiple SSB groups, each group having multiple symbols (e.g., four symbols) to map SSB. The subcarrier spacing is Δf=2^μ·15 kHz, where μ is a positive integer. The first OFDM symbol each candidate SSB group has a symbol index of {4, 14}+n×24, where n={0, 1, ..., k–1}. In some embodiments, n can be a subset of non-negative integers selected from {0, 1, ..., k–1}. Here, $$k = \frac{T}{t} \times \left(\frac{n_{scs}}{120}\right).$$

For subcarrier spacing of 120 kHz, $n_{scs}$=120, and k=20. That is, each half radio frame using ECP has 40 slots, each having 12 symbols. The symbol index of the first OFDM symbol in each candidate SSB group is organized based on groups of two slots, each group having 24 symbols. The symbol index of the first OFDM symbol in each candidate SSB group can also be {4, 151+n×24, {4, 16}+n×24, 15, 14}+n×24, {5, 151+n×24, 15, 16}+n×24, {6, 14}+n×24, {6, 15}+n×24, {6, 16}+n×24.

Such design can support the time division multiplexing and coexistence of the control channel with the subcarrier spacing of 120 kHz using both NCP and ECP, and the control channel with the subcarrier spacing of 60 kHz using both NCP and ECP. In some embodiments, similar design can support SSBs such as 60 kHz, 240 kHz, 480 kHz, and 960 kHz in addition to supporting SSBs with an SCS of 120 kHz. For example, when $n_{scs}$=60 kHz, the design can be applied to support time division multiplexing and coexistence of control channels with SCS of 60 kHz using ECP and control channels with subcarrier spacing of 60 kHz using NCP and 30 kHz using NCP. As another example, when $n_{scs}$=240 kHz, the design can be applied to support time division multiplexing and coexistence of control channels with SCS of 240 kHz using ECP and control channels with subcarrier spacing of 240 kHz using NCP and 120 kHz using NCP. In one more example, when $n_{scs}$=480 kHz, the design can be applied to support time division multiplexing and coexistence of control channels with SCS of 480 kHz using ECP and control channels with subcarrier spacing of 480 kHz using NCP and 2400 kHz using NCP. In yet another example, when $n_{scs}$=960 kHz, the design can be applied to support time division multiplexing and coexistence of control channels with SCS of 960 kHz using ECP and control channels with subcarrier spacing of 960 kHz using NCP and 480 kHz using NCP.

Embodiment 5

This embodiment describes an example of SSB mapping with a SCS of 120 kHz using NCP. The data channel described in this embodiment has two types of structures: the first SCS is 60 kHz with NCP so that each slot includes 14 symbols (e.g., OFDM symbols), and the second SCS is 120 kHz with ECP so that each slot includes 12 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 10:
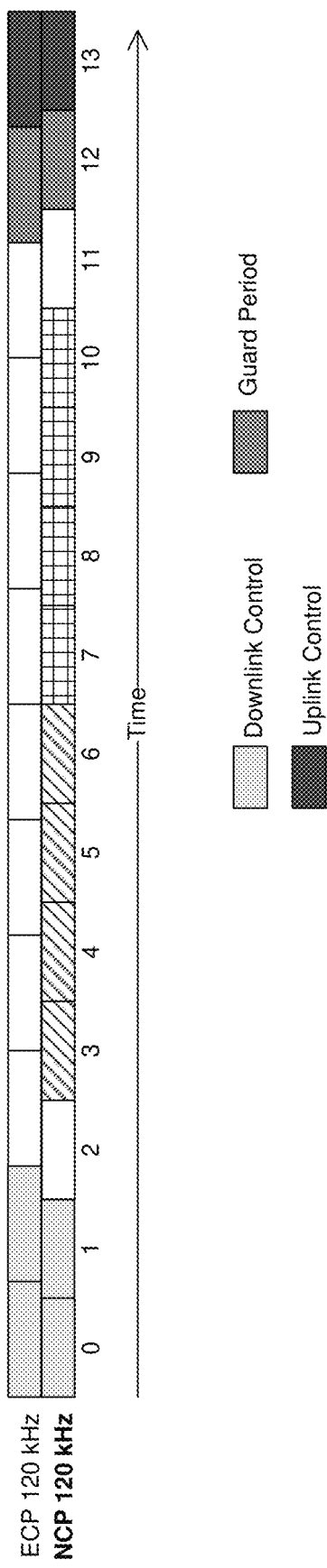
FIG. 10 shows an example mapping of the SSBs with a subcarrier spacing of 120 kHz in a period of t=0.125 milliseconds in accordance with one or more embodiments of the disclosed technology.

FIG. 10 shows an example mapping of the SSBs with a subcarrier spacing of 120 kHz in a period of t=0.125 milliseconds in accordance with one or more embodiments of the disclosed technology. One radio frame as a length of 2×T=10 ms (that is, T=5 ms). When the subcarrier spacing is 120 kHz, the length of a slot is 0.125 ms. To account for the impact of different subcarrier spacings, the mapping of the SSBs needs to avoid the downlink/uplink control symbols as well as the guard periods of symbols having other subcarrier spacings. The mapping of the SSBs to symbols using ECP also needs to avoid the downlink/uplink control symbols as well as the guard periods of symbols using NCP.

In this embodiment, one or more SSB can be selected from multiple SSB groups, each group having multiple symbols (e.g., four symbols) to map SSB. The subcarrier spacing is Δf=2^μ·15 kHz, where μ is a positive integer. The first OFDM symbol each candidate SSB group has a symbol index of {3, 7}+n×14, where n={0, 1, ..., k–1}. In some embodiments, n can be a subset of non-negative integers selected from {0, 1, ..., k–1}. Here, $$k = \frac{T}{t} \times \left(\frac{n_{scs}}{120}\right).$$

For subcarrier spacing of 120 kHz, $n_{scs}$=120, and k=40. That is, each half radio frame using ECP has 40 slots, each having 14 symbols. The symbol index of the first OFDM symbol in each candidate SSB group is organized based on the slots.

Such design can support the time division multiplexing and coexistence of the control channel with the subcarrier spacing of 120 kHz using NCP and ECP. In some embodiments, similar design can support SSBs such as 60 kHz, 240 kHz, 480 kHz, and 960 kHz in addition to supporting SSBs with an SCS of 120 kHz using both NCP and ECP.

Embodiment 6

This embodiment describes an example of SSB mapping with a SCS of 120 kHz using NCP. The data channel described in this embodiment has three types of structures: the first SCS is 60 kHz with ECP so that each slot includes 12 symbols (e.g., OFDM symbols), the second SCS is 120 kHz with ECP so that each slot includes 12 symbols (e.g., OFDM symbols), and the third SCS is 120 kHz with NCP so that each slot includes 14 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 11:
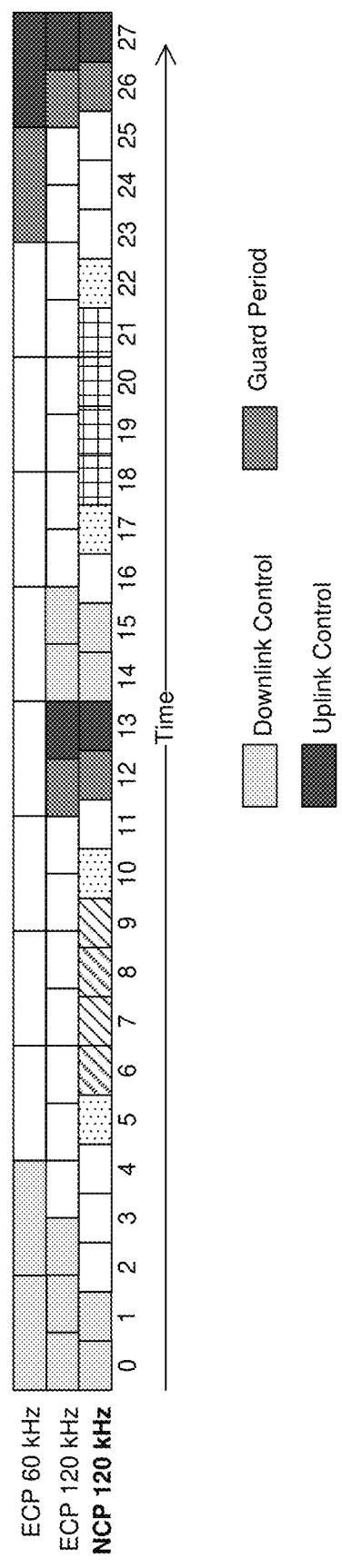
FIG. 11 shows an example mapping of the SSBs with a subcarrier spacing of 120 kHz in a period of t=0.25 milliseconds in accordance with one or more embodiments of the disclosed technology.

FIG. 11 shows an example mapping of the SSBs with a subcarrier spacing of 120 kHz in a period of t=0.25 milliseconds in accordance with one or more embodiments of the disclosed technology. One radio frame as a length of 2×T=10 ms (that is, T=5 ms). When the subcarrier spacing is 120 kHz, the length of a slot is 0.125 ms. To account for the impact of different subcarrier spacings, the mapping of the SSBs needs to avoid the downlink/uplink control symbols as well as the guard periods of symbols having other subcarrier spacings. The mapping of the SSBs to symbols using ECP also needs to avoid the downlink/uplink control symbols as well as the guard periods of symbols using NCP.

In this embodiment, one or more SSB can be selected from multiple SSB groups, each group having multiple symbols (e.g., four symbols) to map SSB. The subcarrier spacing is Δf=2^μ·15 kHz, where μ is a positive integer. The first OFDM symbol each candidate SSB group has a symbol index of {5, 15}+n×28, where n={0, 1, . . . , k−1}. In some embodiments, n can be a subset of non-negative integers selected from {0, 1, . . . , k−1}. Here, $$k = \frac{T}{t} \times \left(\frac{n_{scs}}{120}\right).$$

For subcarrier spacing of 120 kHz, $n_{scs}$=120, and k=20. That is, each half radio frame using ECP has 40 slots, each having 14 symbols. The symbol index of the first OFDM symbol in each candidate SSB group is organized based on groups of two slots, each group having 28 symbols. The symbol index of the first OFDM symbol in each candidate SSB group can also be {5, 16}+n×28, {5, 17}+n×28, {6, 15}+n×28, {6, 16}+n×28, {6, 17}+n×28, {7, 15}+n×28, {7, 16}+n×28, {7, 17}+n×28.

Such design can support the time division multiplexing and coexistence of the control channel with the subcarrier spacing of 120 kHz using both NCP and ECP, and the control channel with the subcarrier spacing of 60 kHz using ECP. In some embodiments, similar design can support SSBs such as 60 kHz, 240 kHz, 480 kHz, and 960 kHz in addition to supporting SSBs with an SCS of 120 kHz. For example, when $n_{scs}$=60 kHz, the design can be applied to support time division multiplexing and coexistence of control channels with SCS of 60 kHz using NCP and control channels with subcarrier spacing of 60 kHz using ECP and 30 kHz using ECP. As another example, when $n_{scs}$=240 kHz, the design can be applied to support time division multiplexing and coexistence of control channels with SCS of 240 kHz using NCP and control channels with subcarrier spacing of 240 kHz using ECP and 120 kHz using ECP. In one more example, when $n_{scs}$=480 kHz, the design can be applied to support time division multiplexing and coexistence of control channels with SCS of 480 kHz using NCP and control channels with subcarrier spacing of 480 kHz using ECP and 2400 kHz using ECP. In yet another example, when $n_{scs}$=960 kHz, the design can be applied to support time division multiplexing and coexistence of control channels with SCS of 960 kHz using NCP and control channels with subcarrier spacing of 960 kHz using ECP and 480 kHz using ECP.

Embodiment 7

This embodiment describes an example of SSB mapping with a SCS of 60 kHz using ECP. Each slot includes 12 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 12:
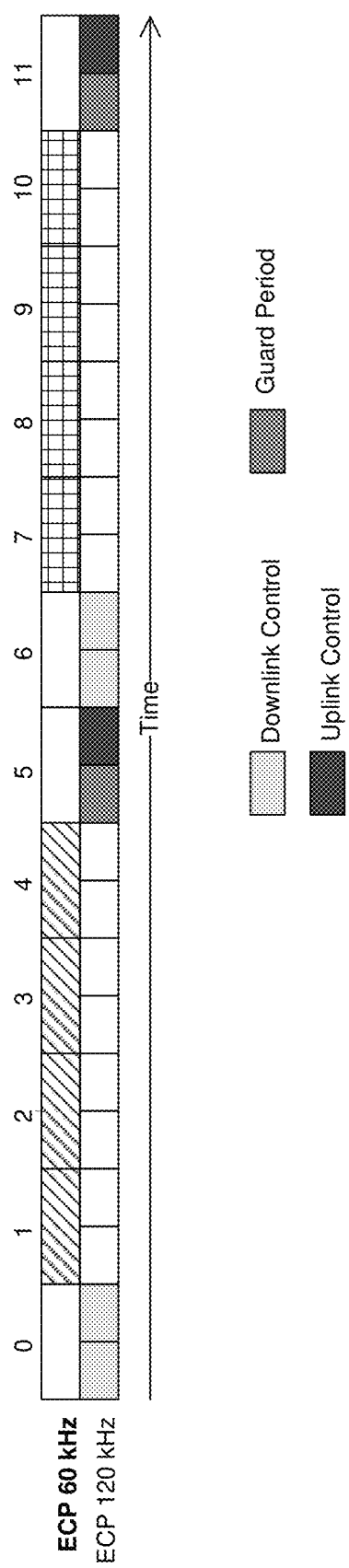
FIG. 12 shows an example mapping of the SSBs with a subcarrier spacing of 60 kHz in a period of t=0.25 milliseconds in accordance with one or more embodiments of the disclosed technology.

FIG. 12 shows an example mapping of the SSBs with a subcarrier spacing of 60 kHz in a period of t=0.25 milliseconds in accordance with one or more embodiments of the disclosed technology. One radio frame as a length of 2×T=10 ms (that is, T=5 ms). When the subcarrier spacing is 60 kHz, the length of a slot is 0.25 ms. To account for the impact of different subcarrier spacings, the mapping of the SSBs to symbols needs to avoid the downlink/uplink control symbols as well as the guard periods of symbols having other subcarrier spacings.

In this embodiment, one or more SSB can be selected from multiple SSB groups, each group having multiple symbols (e.g., four symbols) to map SSB. The subcarrier spacing is Δf=2^μ·15 kHz, where μ is a positive integer. The first OFDM symbol each candidate SSB group has a symbol index of 11, 71+n×12, where n={0, 1, . . . , k−1}. In some embodiments, n can be a subset of non-negative integers selected from {0, 1, . . . , k−1}. Here, $$k = \frac{T}{t}.$$

For subcarrier spacing of 60 kHz, k=20. That is, each half radio frame using ECP has 20 slots, each having 12 symbols. The symbol index of the first OFDM symbol in each candidate SSB group is organized based on the slots.

Such design can support the time division multiplexing and coexistence of the control channel with the subcarrier spacing of 60 kHz using ECP and the control channel with the subcarrier spacing of 120 kHz using ECP. In some embodiments, similar design can support SSBs such as 120 kHz, 240 kHz, 480 kHz, and 960 kHz in addition to supporting SSBs with an SCS of 60 kHz. For example, when $n_{scs}$=120 kHz, the design can be applied to support time division multiplexing and coexistence of control channels with SCS of 120 kHz using ECP and control channels with subcarrier spacing of 240 kHz using ECP. As another example, when $n_{scs}$=240 kHz, the design can be applied to support time division multiplexing and coexistence of control channels with SCS of 240 kHz using ECP and control channels with subcarrier spacing of 480 kHz using ECP. In yet another example, when $n_{scs}$=960 kHz, the design can be applied to support time division multiplexing and coexistence of control channels with SCS of 960 kHz using CEP and control channels with subcarrier spacing of 1820 kHz using ECP.

Embodiment 8

This embodiment describes an example of SSB mapping with a SCS of 60 kHz using ECP. Each slot includes 12 symbols (e.g., OFDM symbols). The OFDM symbols can be used to transmit control information and data for both uplink and downlink transmissions. Some of the OFDM symbols are used as a guard period to ensure that uplink and downlink transmission do not interfere with each other.

Figure 13:
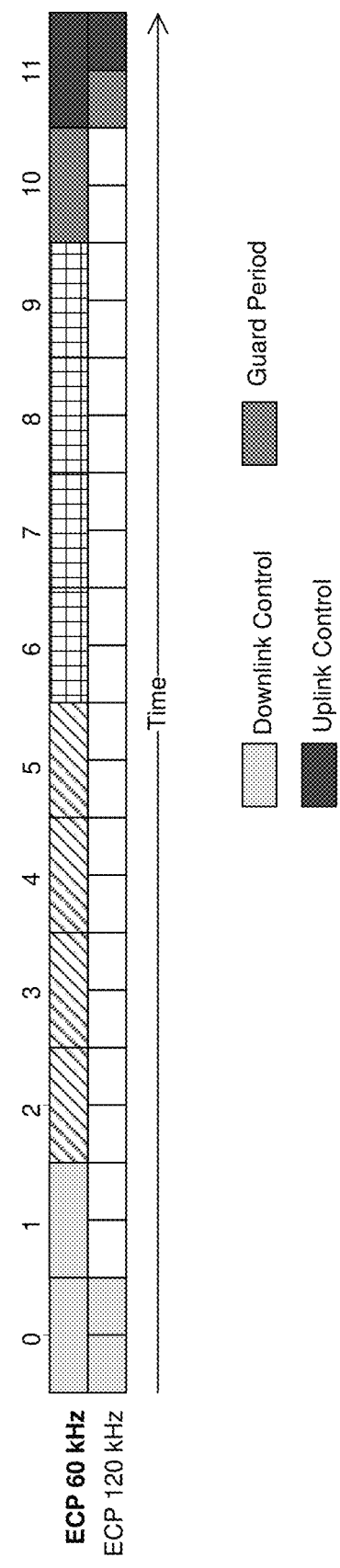
FIG. 13 shows an example mapping of the SSBs with a subcarrier spacing of 60 kHz in a period of t=0.25 milliseconds in accordance with one or more embodiments of the disclosed technology.

FIG. 13 shows an example mapping of the SSBs with a subcarrier spacing of 60 kHz in a period of t=0.25 milliseconds in accordance with one or more embodiments of the disclosed technology. One radio frame as a length of 2×T=10 ms (that is, T=5 ms). When the subcarrier spacing is 60 kHz, the length of a slot is 0.25 ms. To account for the impact of different subcarrier spacings, the mapping of the SSBs to symbols needs to avoid the downlink/uplink control symbols as well as the guard periods of symbols having other subcarrier spacings.

In this embodiment, one or more SSB can be selected from multiple SSB groups, each group having multiple symbols (e.g., four symbols) to map SSB. The subcarrier spacing is $\Delta f=2^\mu \cdot 15$ kHz, where $\mu$ is a positive integer. The first OFDM symbol each candidate SSB group has a symbol index of $\{2, 61+n\times12$, where n=$\{0, 1, \ldots, k-1\}$. In some embodiments, n can be a subset of non-negative integers selected from 10, 1, \ldots, k-1\}. Here, $$k = \frac{T}{t}.$$

For subcarrier spacing of 60 kHz, k=20. That is, each half radio frame using ECP has 20 slots, each having 12 symbols. The symbol index of the first OFDM symbol in each candidate SSB group is organized based on the slots.

Such design can support the time division multiplexing and coexistence of the control channel with the subcarrier spacing of 60 kHz using ECP and the control channel with the subcarrier spacing of 120 kHz using ECP.

Embodiment 9

This embodiment describes determining a correspondence of time-domain positions between an SSB and a control resource set (CORESET). In this example, each SSB includes four consecutive symbols (e.g., OFDM symbols), and each slot includes 14 symbols using NCP. The slot index and the system frame number of the control resource set are $n_c$ and $SFN_c$ respectively. The slot index and the system frame number the SSB are $n_{SSB,i}$ and $SFN_{SSB,i}$ respectively, wherein i is an index of the SSB. The multiplexing mode of the SSB and the control resource set in this particular embodiment is Pattern2 as shown in FIG. 3B.

Figure 14A:
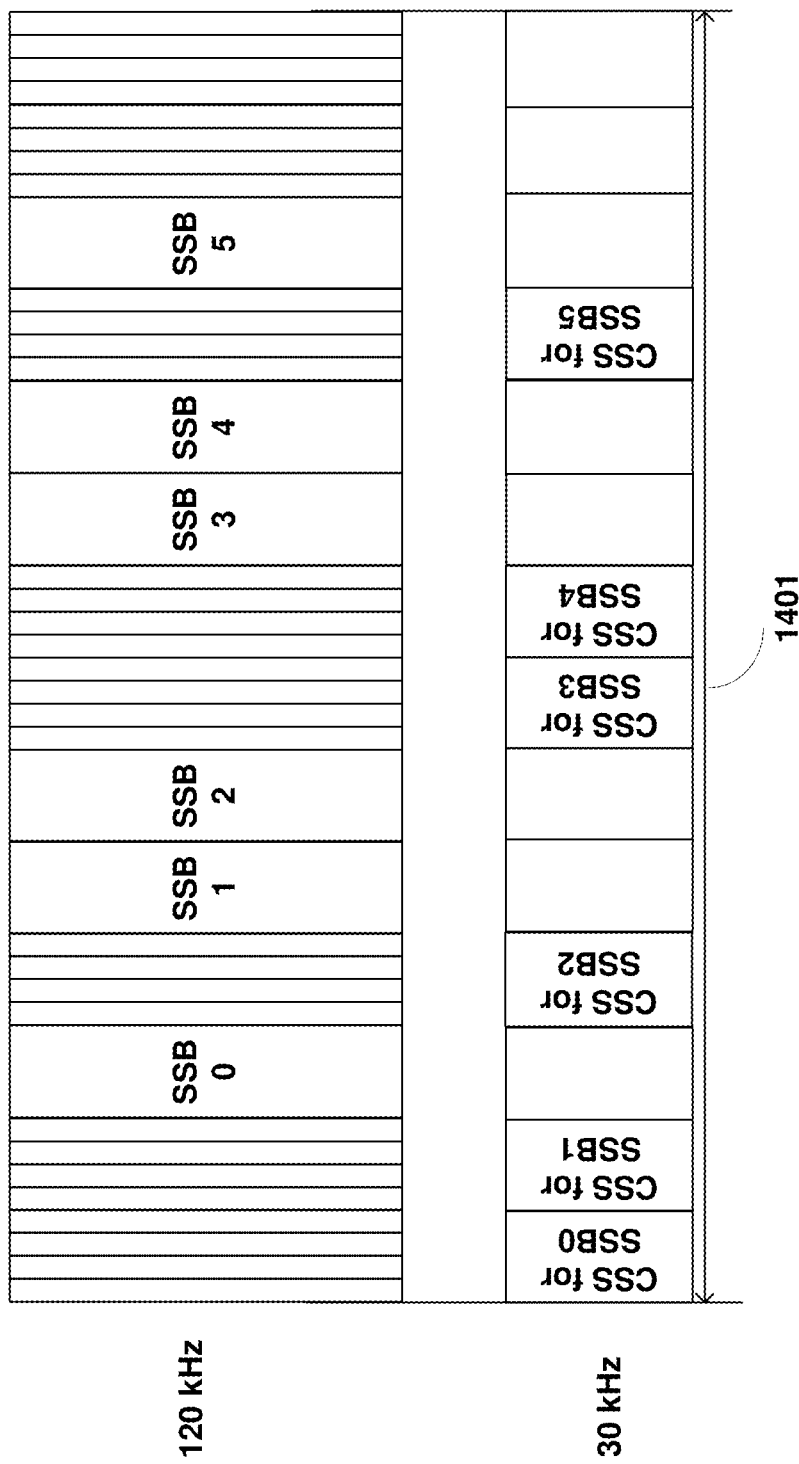
FIG. 14A illustrates an example correspondence between SSB of a subcarrier spacing of 120 kHz and the Control Resource Set (CORESET) of a subcarrier spacing of 30 kHz in accordance with one or more embodiments of the disclosed technology.
Figure 14B:
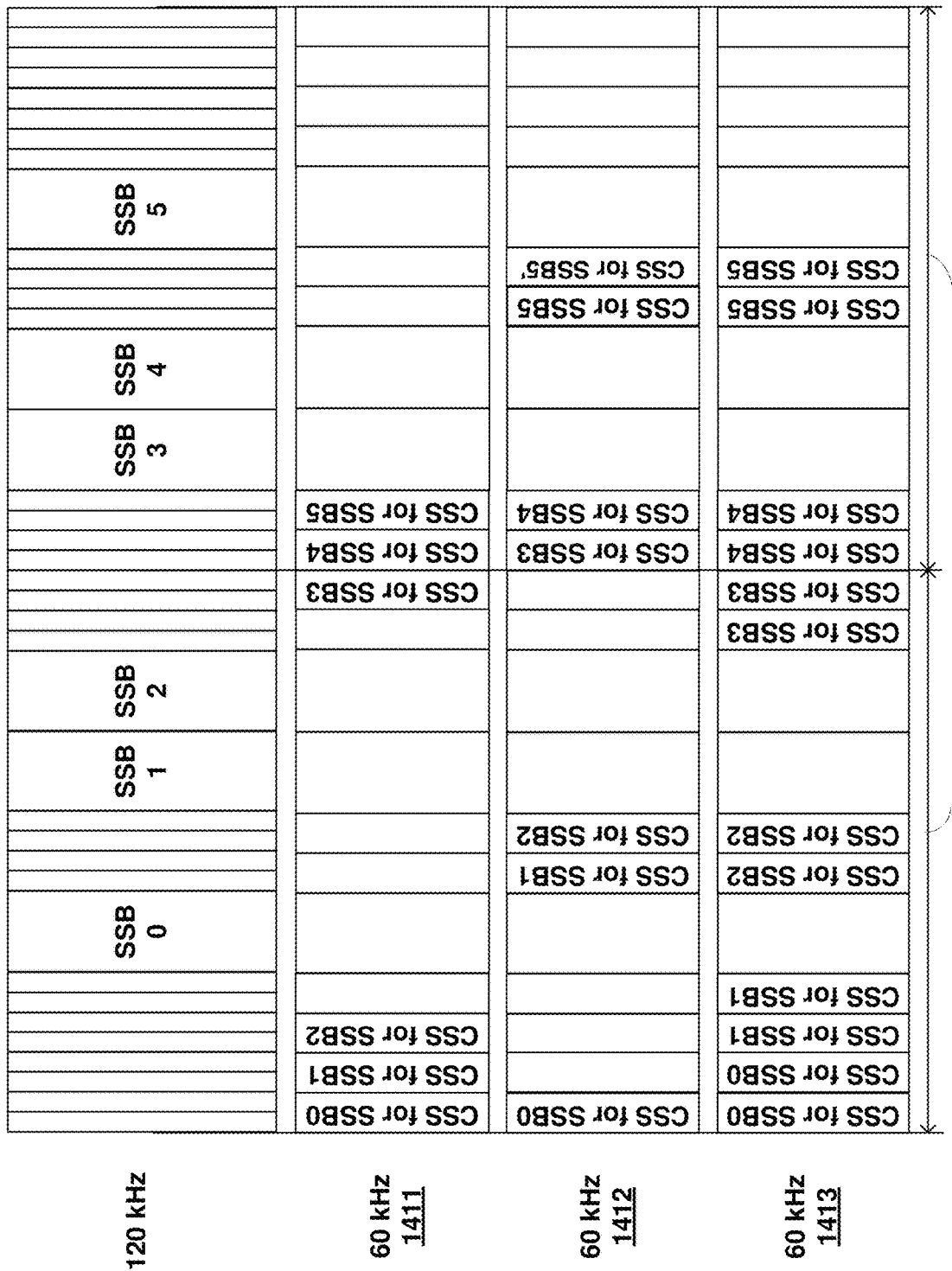
FIG. 14B illustrates an example correspondence between SSB of a subcarrier spacing of 120 kHz and the Control Resource Set (CORESET) of a subcarrier spacing of 60 kHz in accordance with one or more embodiments of the disclosed technology.
Figure 14C:
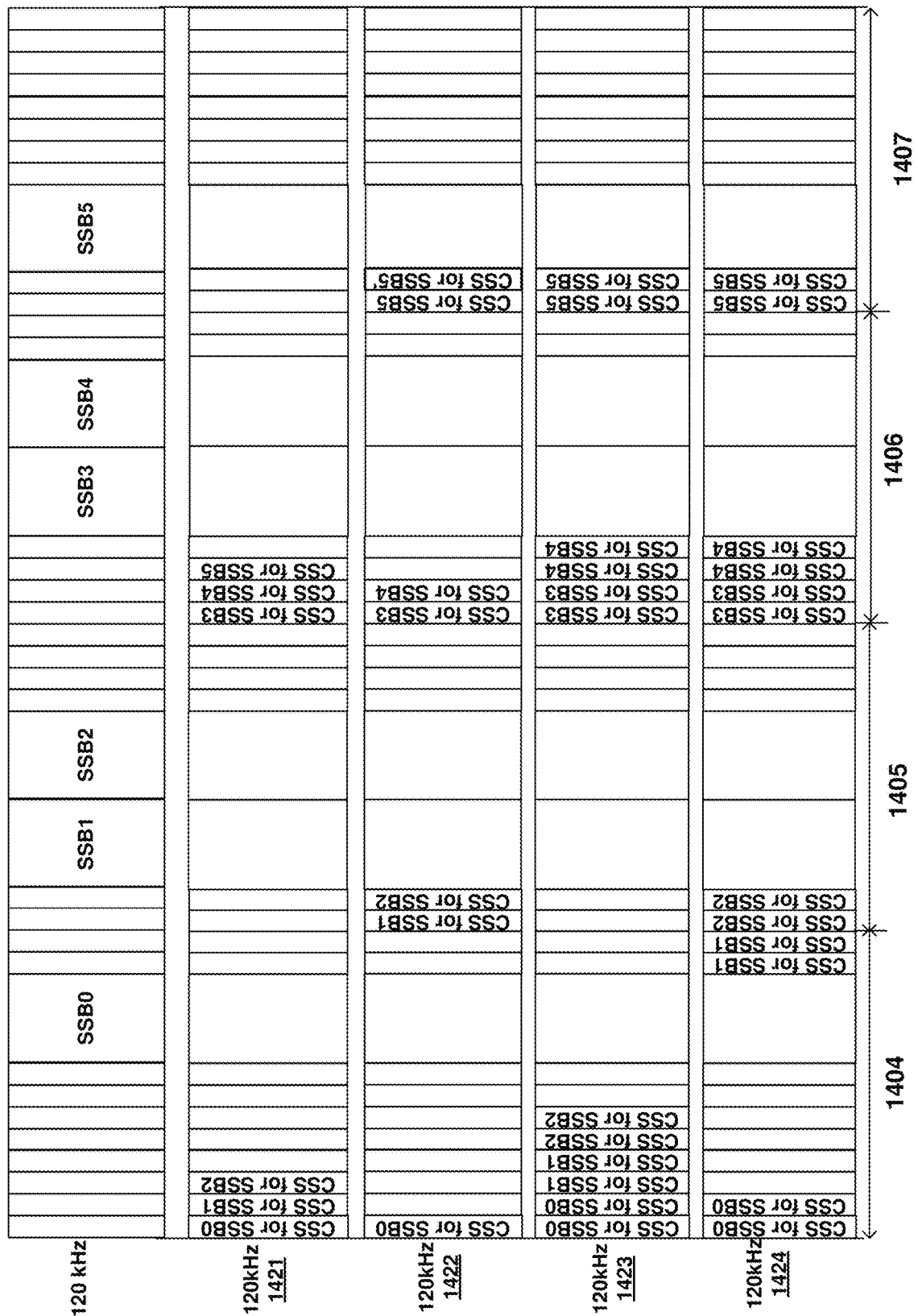
FIG. 14C illustrates an example correspondence between SSB of a subcarrier spacing of 120 kHz and the Control Resource Set (CORESET) of a subcarrier spacing of 120 kHz in accordance with one or more embodiments of the disclosed technology.

The SSB mapping described in Embodiment 1 is used in this embodiment as an example. FIGS. 14A-C illustrate example correspondence between SSB of SCS=120 kHz and the CORESET of SCS=30, 60, and 120 kHz in accordance with one or more embodiments of the disclosed technology.

FIG. 14A illustrates a correspondence between the SSB of SCS=120 kHz and the control regions of SCS=30 kHz. For example, given a time-domain location of $SSB_i$, the slot index, system frame number, and the start symbol index of the CORESET can be determined based on the following rules:

1. When SCS is 30 kHz, $SFN_c=SFN_{SSB,i}$ and $n_c=n_{SSB,i}$. That is, the time-domain locations of an SSB and the corresponding control resource set are both in the same time slot of the same radio frame. The SSB and the corresponding control resource set satisfy the quasi-co-location relationship, and can be transmitted using the same port. For example, in FIG. 14A, the time-domain locations of $SSB_1$ to $SSB_5$ are within the same time slot 1401.

2. When SCS is 30 kHz, the starting symbol indices of the control resource set in the slot are 0, 1, 3, 6, 7, or 10, which correspond respectively to the SSBs whose indices satisfy i=6k, i=6k+1, i=6k+2, i=6k+3, i=6k+4, i=6k+5, wherein k=$\{0, \ldots, 2N+1\}$ and N is an integer. For example, in this specific example, i=0, 1, \ldots, 5 for $SSB_0$ to $SSB_5$.

FIG. 14B illustrates three types of correspondence between the SSB of SCS=120 kHz and the control regions of SCS=60 kHz. For example, given a time-domain location of $SSB_i$, the slot index, system frame number, and the start symbol index of the CORESET can be determined based on the following rules:

1. In the first case 1411, $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0 (corresponding to $SSB_0$ in slot 1402), 1 (corresponding to $SSB_1$ in slot 1402), 2 (corresponding to $SSB_2$ in slot 1402), 0 (corresponding to $SSB_4$ in slot 1403), and 1 (corresponding to $SSB_5$ in slot 1403). The indices correspond respectively to the SSBs whose indices satisfy i=6k, i=6k+1, i=6k+2, i=6k+4, i=6k+5, where k=$\{0, \ldots, 2N+1\}$ and N is an integer. When $n_c=n_{SSB,i}-1$, the starting symbol index of the control resource set is 13 (corresponding to $SSB_3$ in slot 1403). The indices correspond respectively to the SSBs whose indices satisfy i=6k+3, where k=$\{0, \ldots, 2N+1\}$ and N is an integer.

2. In the second case 1412, $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1402), 6 (corresponding to $SSB_1$ in slot 1402), 7 (corresponding to $SSB_2$ in slot 1402), 0 (corresponding to $SSB_3$ in slot 1403), 1 (corresponding to $SSB_4$ in slot 1403), and 6 or 7 (corresponding to $SSB_5$ in slot 1403). The indices correspond respectively to the SSBs whose indices satisfy i=6k, i=6k+1, i=6k+2, i=6k+3, i=6k+4, i=6k+5, where k=$\{0, \ldots, 2N+1\}$ and N is an integer.

3. In the third case 1413, each CORESET occupies two symbols in the time domain. $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1402), 2 (corresponding to $SSB_1$ in slot 1402), 6 (corresponding to $SSB_2$ in slot 1402), 0 (corresponding to $SSB_4$ in slot 1403), and 6 (corresponding to $SSB_5$ in slot 1403). The indices correspond respectively to the SSBs whose indices satisfy i=6k, i=6k+1, i=6k+2, i=6k+4, i=6k+5, wherein k={0, . . . , 2+1} and N is an integer. When $n_c=n_{SSB,i}-1$, the starting symbol index of the control resource set is 12 (corresponding to $SSB_3$ in slot 1403). The indices correspond respectively to the SSBs whose indices satisfy i=6k+3, where k={0, . . . , 2N+1} and N is an integer.

FIG. 14C illustrates four types of correspondence between the SSB of SCS=120 kHz and the control regions of SCS=120 kHz. For example, given a time-domain location of $SSB_i$, the slot index, system frame number, and the start symbol index of the CORESET can be determined based on the following rules:

1. In the first case 1421, $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1404), 0 (corresponding to $SSB_3$ in slot 1406), and 1 (corresponding to $SSB_4$ in slot 1406). The indices correspond respectively to the SSBs whose indices satisfy i=6k, i=6k+3, i=6k+4, where k={0, . . . , 2N+1} and N is an integer. When $n_c=n_{SSB,i}-1$, the starting symbol indices of the control resource set are 1 (corresponding to $SSB_1$ in slot 1405), 2 (corresponding to $SSB_2$ in slot 1405), and 2 (corresponding to $SSB_5$ in slot 1407). The indices correspond respectively to the SSBs whose indices satisfy i=6k, i=6k+2, i=6k+5, where k={0, . . . , 2N+1} and N is an integer.

2. In the second case 1422, $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1404), 0 (corresponding to $SSB_1$ in slot 1405), 1 (corresponding to $SSB_2$ in slot 1405), 0 (corresponding to $SSB_3$ in slot 1406), 1 (corresponding to $SSB_4$ in slot 1406), and 0 or 1 (corresponding to $SSB_5$ in slot 1407).

The indices correspond respectively to the SSBs whose indices satisfy i=6k, i=6k+1, i=6k+2, i=6k+3, i=6k+4, i=6k+5, where k={0, . . . , 2N+1} and N is an integer.

3. In the third case 1423, each CORESET occupies two symbols in the time domain. $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1404), 0 (corresponding to $SSB_3$ in slot 1406), 2 (corresponding to $SSB_4$ in slot 1406), and 0 (corresponding to $SSB_5$ in slot 1407). The indices correspond respectively to the SSBs whose indices satisfy i=6k, i=6k+3, i=6k+4, i=6k+5, where k={0, . . . , 2N+1} and N is an integer. When $n_c=n_{SSB,i}-1$, the starting symbol indices of the control resource set are 2 (corresponding to $SSB_1$ in slot 1405) and 4 (corresponding to $SSB_2$ in slot 1405). The indices correspond respectively to the SSBs whose indices satisfy i=6k+1, i=6k+2, where k={0, . . . , 2N+1} and N is an integer.

4. In the fourth case 1424, each CORESET occupies two symbols in the time domain. $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1404), 0 (corresponding to $SSB_2$ in slot 1405), 0 (corresponding to $SSB_3$ in slot 1406), 2 (corresponding to $SSB_4$ in slot 1406), and 0 (corresponding to SSB5 in slot 1407). The indices correspond respectively to the SSBs whose indices satisfy i=6k, i=6k+2, i=6k+3, i=6k+4, i=6k+5, where k={0, . . . , 2N+1} and N is an integer. When $n_c=n_{SSB,i}-1$, the starting symbol index of the control resource set is 12 (corresponding to $SSB_1$ in slot 1405). The index corresponds respectively to the SSBs whose indices satisfy i=6k+1, where k={0, . . . , 2N+1} and N is an integer.

Table 1 summarizes the correspondence between the CORESETs and SSBs discussed above.

TABLE 1

Example correspondence between CORESETs and SSBs

| SCS | System Frame Number, Slot Number | The index of the first symbol (k = 0, 1, . . ., k₀) |
|---|---|---|
| 30 kHz | $SFN_C = SFN_{SSB,i}$<br>$n_C = n_{SSB,i}$ | 0, 1, 3, 6, 7, 10 correspond to i = 6k, i = 6k + 1,<br>i = 6k + 2, i = 6k + 3, i = 6k + 4, i = 6k + 5<br>($n_C = n_{SSB,i}$) |
| 60 kHz | $SFN_C = SFN_{SSB,i}$<br>$n_C = n_{SSB,i}$ or<br>$n_C = n_{SSB,i} - 1$ | 0, 1, 2, 0, 1 correspond to i = 6k, i = 6k + 1,<br>i = 6k + 2, i = 6k + 4, i = 6k + 5 ($n_C = n_{SSB,i}$);<br>13 corresponds to i = 6k + 3 ($n_C = n_{SSB,i} - 1$) |
| | $SFN_C = SFN_{SSB,i}$<br>$n_C = n_{SSB,i}$ | 0, 6, 7, 0, 1, 6/7 correspond to i = 6k,<br>i = 6k + 1, i = 6k + 2, i = 6k + 3, i = 6k + 4,<br>i = 6k + 5 ($n_C = n_{SSB,i}$) |
| | $SFN_C = SFN_{SSB,i}$<br>$n_C = n_{SSB,i}$ or<br>$n_C = n_{SSB,i} - 1$ | 0, 2, 6, 0, 6 correspond to i = 6k, i = 6k + 1,<br>i = 6k + 2, i = 6k + 4, i = 6k + 5 ($n_C = n_{SSBi}$);<br>12 corresponds to i = 6k + 3 ($n_C = n_{SSB,i} - 1$) |
| 120 kHz | $SFN_C = SFN_{SSB,i}$<br>$n_C = nSSB,i$ or<br>$n_C = n_{SSB,i} - 1$ | 0, 0, 1 correspond to i = 6k, i = 6k + 3,<br>i = 6k + 4($n_C = n_{SSB,i}$);<br>1, 2, 2 correspond to i = 6k + 1, i = 6k + 2,<br>i = 6k + 5 ($n_C = n_{SSB,i} - 1$) |
| | $SFN_C = SFN_{SSB,i}$ | 0, 0, 1, 0, 1, 0/1 correspond to i = 6k ,<br>i = 6k + 1, i = 6k +2, i = 6k + 3, i = 6k + 4, i = 6k + 5<br>($n_C = n_{SSB,i}$) |
| | $SFN_C = SFN_{SSB,i}$<br>$n_C = n_{SSB,i}$ or<br>$n_C = n_{SSB,i} - 1$ | 0, 0, 2, 0 correspond to i = 6k , i = 6k + 3,<br>i = 6k + 4, i = 6k + 5 ($n_C = n_{SSB,i}$);<br>2, 4 correspond to i = 6k + 1 , i = 6k + 2<br>($n_C = n_{SSB,i} - 1$) |
| | $SFN_C = SFN_{SSB,i}$<br>$n_C = n_{SSB,i}$ or<br>$n_C = n_{SSB,i} - 1$ | 0, 0, 0, 2, 0 correspond to i = 6k, i = 6k + 2,<br>i = 6k + 3, i = 6k + 4, i = 6k + 5 ($n_C = n_{SSB,i}$);<br>12 corresponds to i = 6k + 1 ($n_C = n_{SSB,i} - 1$) |

The design described in this embodiment can determine the correspondence between the SSB index and the time domain location of the control resource set so that the SSB index with the SCS of 120 kHz can correspond to the time domain location of the control resource set with the SCS of 30, 60, and 120 kHz. The design can also be applied to other subcarrier spacings such as 60 kHz, 240 kHz, 480 kHz, and 960 kHz. The control resource set SCS corresponding to the SSB with the SCS of 60 kHz is 15, 30, 60 kHz. The control resource set SCS corresponding to the SSB with the SCS of 120 kHz is 30, 60, 120 kHz. The control resource set SCS corresponding to the SSB with the SCS of 480 kHz is 120, 240, 480 kHz. The control resource set SCS corresponding to the SSB with the SCS of 960 kHz is 240, 480, 960 kHz.

It is noted that, while the SSB structure described in Embodiment 1 is used as an example, other time domain structures of SSB can also be supported, and corresponding descriptions are not repeated.

Embodiment 10

This embodiment describes determining a correspondence of time-domain positions between an SSB and a CORESET. In this example, each SSB includes four consecutive symbols (e.g., OFDM symbols), and each slot includes 14 symbols using NCP. The slot index and the system frame number of the control resource set are $n_c$ and $SFN_c$ respectively. The slot index and the system frame number the SSB are $n_{SSB,i}$ and $SFN_{SSB,i}$ respectively, wherein i is an index of the SSB. The multiplexing mode of the SSB and the control resource set in this particular embodiment is Pattern2 as shown in FIG. 3B.

Figure 15A:
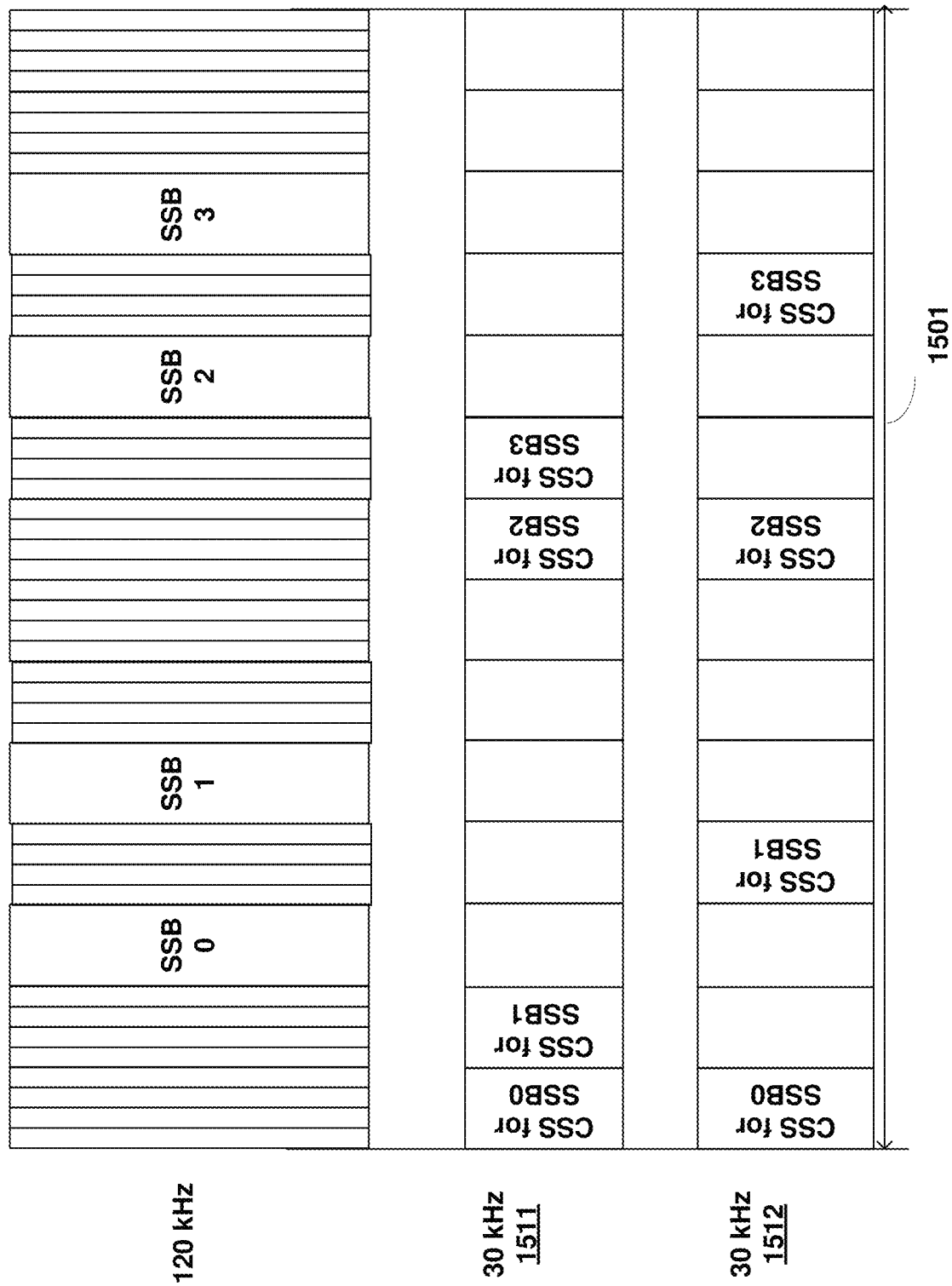
FIG. 15A illustrates an example correspondence between SSB of a subcarrier spacing of 120 kHz and the Control Resource Set (CORESET) of a subcarrier spacing of 30 kHz in accordance with one or more embodiments of the disclosed technology.
Figure 15B:
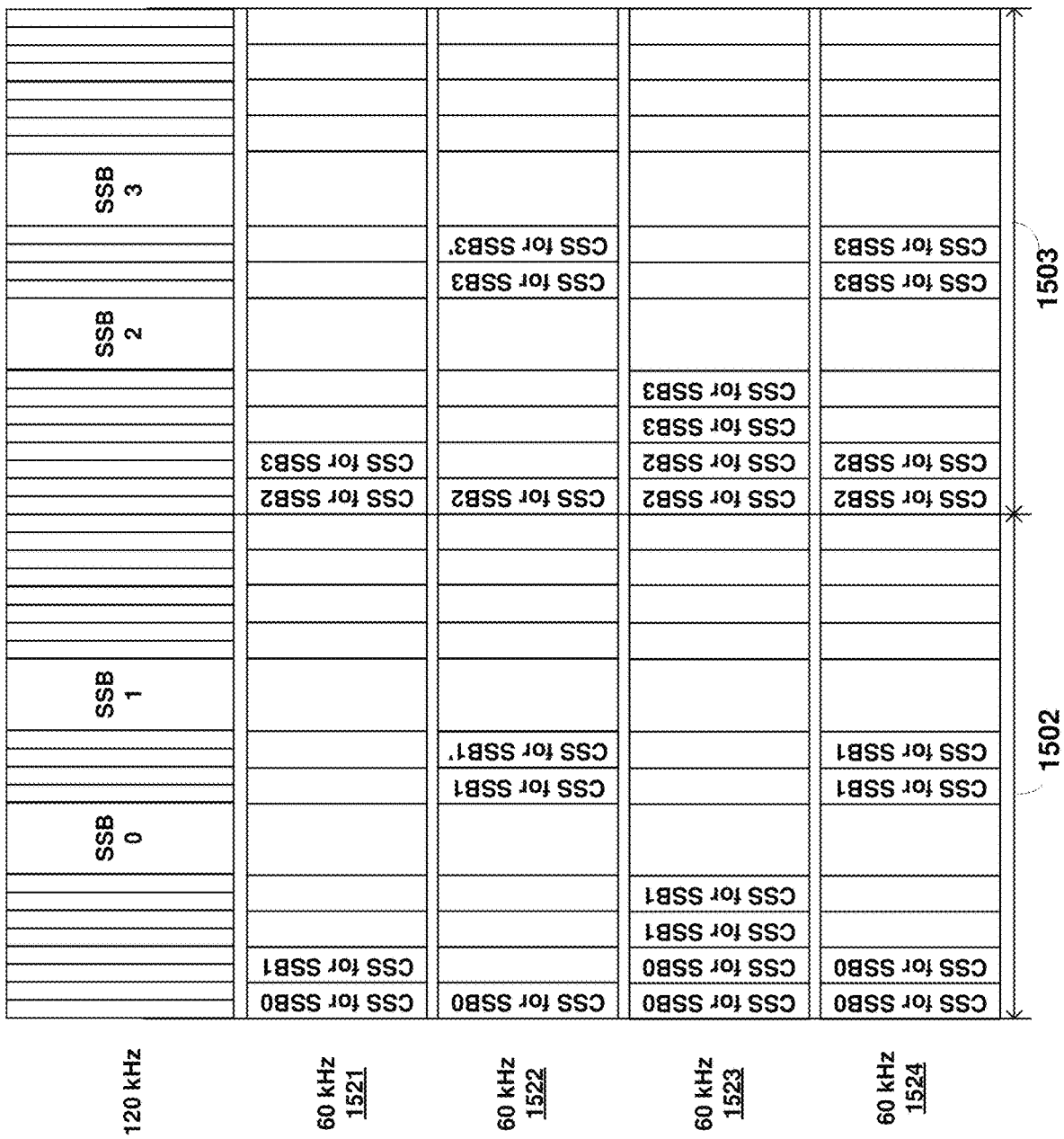
FIG. 15B illustrates an example correspondence between SSB of a subcarrier spacing of 120 kHz and the Control Resource Set (CORESET) of a subcarrier spacing of 60 kHz in accordance with one or more embodiments of the disclosed technology.
Figure 15C:
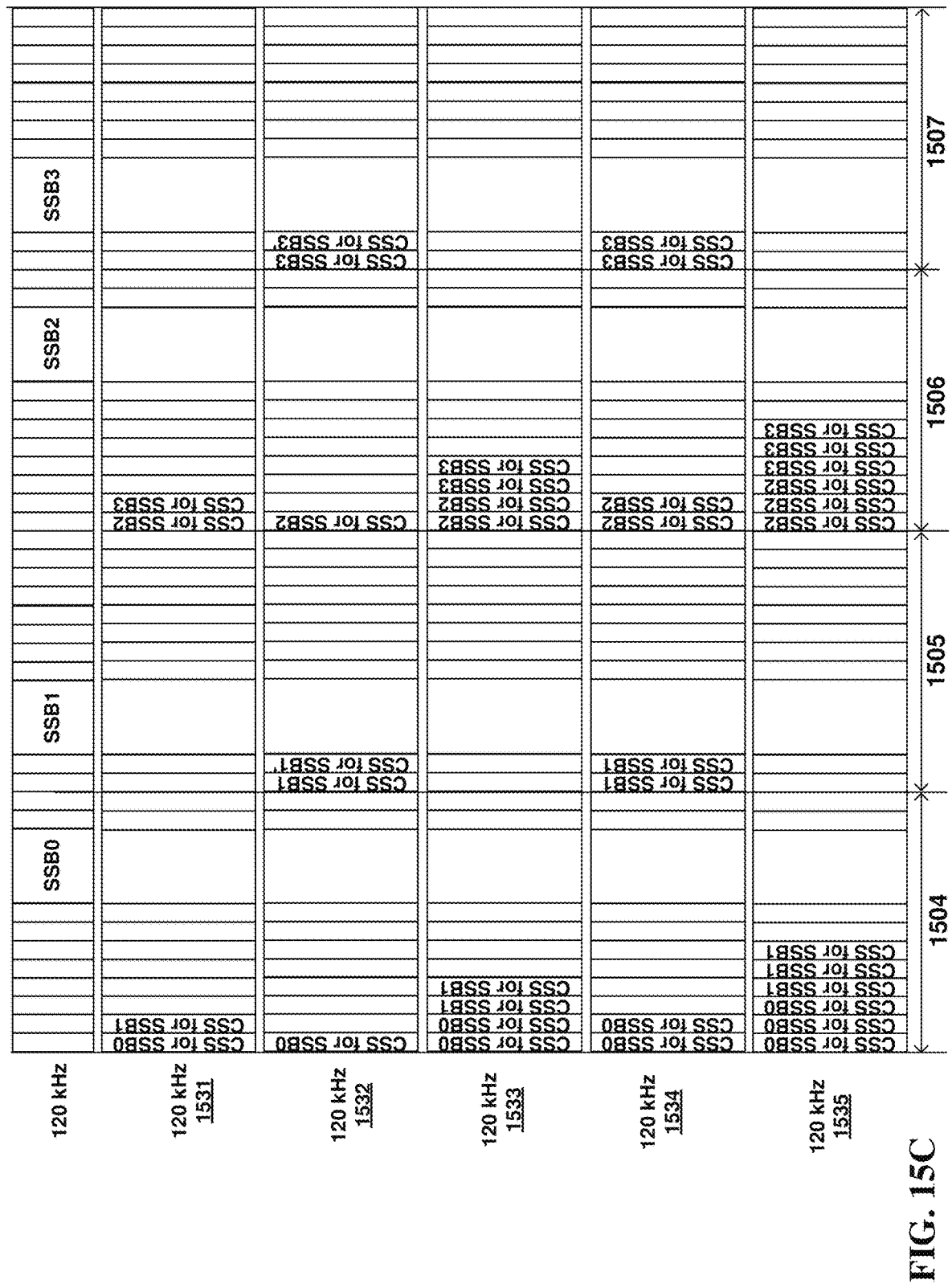
FIG. 15C illustrates an example correspondence between SSB of a subcarrier spacing of 120 kHz and the Control Resource Set (CORESET) of a subcarrier spacing of 120 kHz in accordance with one or more embodiments of the disclosed technology.

The SSB mapping described in Embodiment 2 is used in this embodiment as an example. FIGS. 15A-C illustrate example correspondence between SSB of SCS=120 kHz and the CORESET of SCS=30, 60, and 120 kHz in accordance with one or more embodiments of the disclosed technology.

FIG. 15A illustrates a correspondence between the SSB of SCS=120 kHz and the control regions of SCS=30 kHz. For example, given a time-domain location of $SSB_i$, the slot index, system frame number, and the start symbol index of the CORESET can be determined based on the following rules:

1. In the first case 1511, $SFN_c=SFN_{SSB,i}$. That is, the SSB and the corresponding control resource set are both located in the same radio frame. When $n_c=n_{SSB,i}$, the starting symbol indices of the control resource set are 0, 1, 7, 8 corresponding to $SSB_0$ to $SSB_3$ whose time-domain locations are within the time slot 1501. The indices correspond respectively to the SSBs whose indices satisfy i=4k, i=4k+1, i=4k+2, i=4k+3, where k={0, . . . , 2+1} and N is an integer.

2. In the second case 1512, $SFN_c=SFN_{SSB,i}$. That is, the SSB and the corresponding control resource set are both located in the same radio frame. When $n_c=n_{SSB,i}$, the starting symbol indices of the control resource set are 0, 3, 7, and 19 corresponding to $SSB_0$ to $SSB_3$ whose time-domain locations are within the time slot 1501. The indices correspond respectively to the SSBs whose indices satisfy i=4k, i=4k+1, i=4k+2, i=4k+3, where k={0, . . . , 2N+1} and N is an integer.

FIG. 15B illustrates four types of correspondence between the SSB of SCS=120 kHz and the control regions of SCS=60 kHz. For example, given a time-domain location of $SSB_i$, the slot index, system frame number, and the start symbol index of the CORESET can be determined based on the following rules:

1. In the first case 1521, $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0 (corresponding to $SSB_0$ in slot 1502), 1 (corresponding to $SSB_1$ in slot 1502), 0 (corresponding to $SSB_2$ in slot 1503), and 1 (corresponding to $SSB_3$ in slot 1503). The indices correspond respectively to the SSBs whose indices satisfy i=4k, i=4k+1, i=4k+2, i=4k+3, where k={0, . . . , 2N+1} and N is an integer.

2. In the second case 1522, $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0 (corresponding to $SSB_0$ in slot 1502), 6 or 7 (corresponding to $SSB_1$ in slot 1502), 0 (corresponding to $SSB_2$ in slot 1503), and 6 or 7 (corresponding to $SSB_3$ in slot 1503). The indices correspond respectively to the SSBs whose indices satisfy i=4k, i=4k+1, i=4k+2, i=4k+3, where k={0, . . . , 2N+1} and N is an integer.

3. In the third case 1523, each CORESET occupies two symbols in the time domain. $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0 (corresponding to $SSB_0$ in slot 1502), 2 (corresponding to $SSB_1$ in slot 1502), 0 (corresponding to $SSB_2$ in slot 1503), and 2 (corresponding to $SSB_3$ in slot 1503). The indices correspond respectively to the SSBs whose indices satisfy i=4k, i=4k+1, i=4k+2, i=4k+3, where k={0, . . . , 2N+1} and N is an integer.

4. In the fourth case 1524, each CORESET occupies two symbols in the time domain. $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0 (corresponding to $SSB_0$ in slot 1502), 6 (corresponding to $SSB_1$ in slot 1502), 0 (corresponding to $SSB_2$ in slot 1503), and 6 (corresponding to $SSB_3$ in slot 1503). The indices correspond respectively to the SSBs whose indices satisfy i=4k, i=4k+1, i=4k+2, i=4k+3, where k={0, . . . , 2N+1} and N is an integer.

FIG. 15C illustrates five types of correspondence between the SSB of SCS=120 kHz and the control regions of SCS=120 kHz. For example, given a time-domain location of $SSB_i$, the slot index, system frame number, and the start symbol index of the CORESET can be determined based on the following rules:

1. In the first case 1531, $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1504), and 0 corresponding to $SSB_2$ in slot 1506). The indices correspond respectively to the SSBs whose indices satisfy i=4k, i=4k+2, where k={0, . . . , 2N+1} and N is an integer. When $n_c=n_{SSB,i}-1$, the starting symbol indices of the control resource set are 1 (corresponding to $SSB_1$ in slot 1505), and 1 corresponding to $SSB_3$ in slot 1507). The indices correspond respectively to the SSBs whose indices satisfy i=4k+1, i=4k+3, where k={0, . . . , 2N+1} and N is an integer.

2. In the second case 1532, $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1504), 0 or 1 (corresponding to $SSB_1$ in slot 1505), 0 (corresponding to $SSB_2$ in slot 1506), and 0 or 1 (corresponding to $SSB_3$ in slot 1507). The indices correspond respectively to the SSBs whose indices satisfy i=4k, i=4k+1, i=4k+2, i=4k+3, where k={0, . . . , 2N+1} and N is an integer.

3. In the third case 1533, each CORESET occupies two symbols in the time domain. $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1504), and 0 corresponding to $SSB_2$ in slot 1506. The indices correspond respectively to the SSBs whose indices satisfy i=4k, i=4k+2, where k={0, . . . , 2N+1} and N is an integer. When $n_c=n_{SSB,i}-1$, the starting symbol indices of the control resource set are 2 (corresponding to $SSB_1$ in slot 1505), and 2 corresponding to $SSB_3$ in slot 1507). The indices correspond respectively to the SSBs whose indices satisfy i=4k+1, i=4k+3 where k={0, . . . , 2N+1} and N is an integer.

4. In the fourth case 1534, each CORESET occupies two symbols in the time domain. $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1502), 0 (corresponding to $SSB_1$ in slot 1502), 0 (corresponding to $SSB_2$ in slot 1503), and 0 (corresponding to $SSB_3$ in slot 1503). The indices correspond respectively to the SSBs whose indices satisfy i=4k, i=4k+1, i=4k+2, i=4k+3, where k={0, . . . , 2N+1} and N is an integer.

5. In the fifth case 1535, each CORESET occupies three symbols in the time domain. $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1504), and 0 corresponding to $SSB_2$ in slot 1506). The indices correspond respectively to the SSBs whose indices satisfy i=4k, i=4k+2, where k={0, . . . , 2N+1} and N is an integer. When $n_c=n_{SSB,i}-1$, the starting symbol indices of the control resource set are 3 (corresponding to $SSB_1$ in slot 1505), and 3 corresponding to $SSB_3$ in slot 1507). The indices correspond respectively to the SSBs whose indices satisfy i=4k+1, i=4k+3, where k={0, . . . , 2N+1} and N is an integer.

Figure 15D:
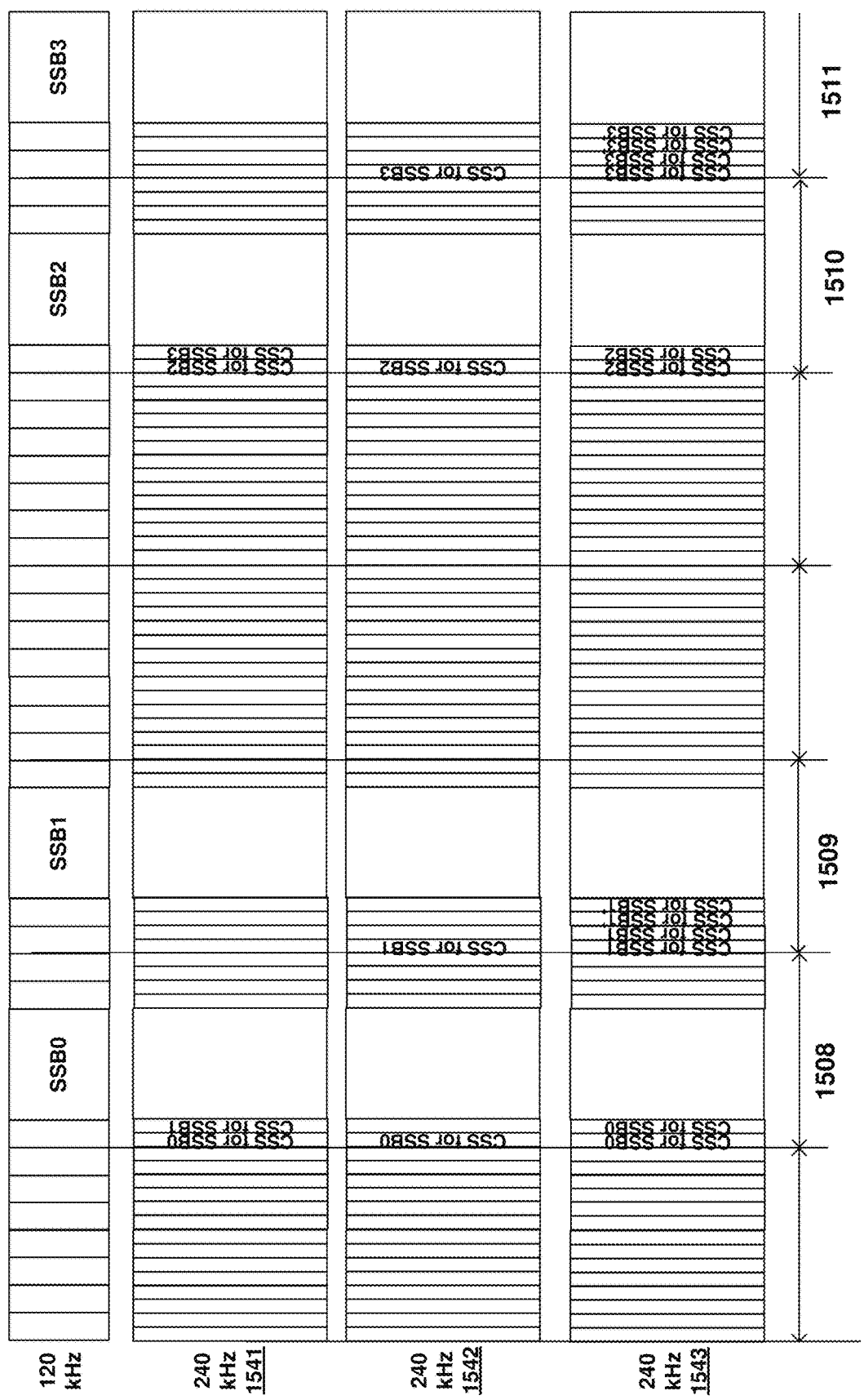
FIG. 15D illustrates three types of correspondence between the SSB of SCS=120 kHz and the control regions of SCS=240 kHz in accordance with one or more embodiments of the disclosed technology.

FIG. 15D illustrates three types of correspondence between the SSB of SCS=120 kHz and the control regions of SCS=240 kHz. For example, given a time-domain location of $SSB_i$, the slot index, system frame number, and the start symbol index of the CORESET can be determined based on the following rules:

1. In the first case 1541, $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1508), and 0 corresponding to $SSB_2$ in slot 1510). The indices correspond respectively to the SSBs whose indices satisfy i=4k, i=4k+2, where k={0, . . . , 2N+1} and N is an integer. When $n_c=n_{SSB,i}-1$, the starting symbol indices of the control resource set are 1 (corresponding to $SSB_1$ in slot 1509), and 1 corresponding to $SSB_3$ in slot 15011). The indices correspond respectively to the SSBs whose indices satisfy i=4k+1, i=4k+3, where k={0, . . . , 2N+1} and N is an integer.

2. In the second case 1542, $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1508), 0 (corresponding to $SSB_1$ in slot 1509), 0 (corresponding to $SSB_2$ in slot 1510), and 0 (corresponding to $SSB_3$ in slot 1510). The indices correspond respectively to the SSBs whose indices satisfy i=4k, i=4k+1, i=4k+2, i=4k+3, where k={0, . . . , 2N+1} and N is an integer.

3. In the third case 1533, each CORESET occupies two symbols in the time domain. $SFN_c=SFN_{SSB,i}$. That is, the SSB and the corresponding control resource set are both located in the same radio frame. When $n_c=n_{SSB,i}$, the starting symbol indices of the control resource set are 0 (corresponding to $SSB_0$ in slot 1508), 0 or 2 (corresponding to $SSB_1$ in slot 1509), 0 (corresponding to $SSB_2$ in slot 1510), and 0 or 2 (corresponding to $SSB_3$ in slot 1510). The indices correspond respectively to the SSBs whose indices satisfy i=4k, i=4k+1, i=4k+2, i=4k+3, where k={0, . . . , 2N+1} and N is an integer.

TABLE 2

Example correspondence between CORESETs and SSBs

| SCS | System Frame Number and Slot Number | The index of the first symbol (k = 0, 1, . . ., $k_0$) |
|---|---|---|
| 30 kHz | $SFN_C = SFN_{SSB,i}$ | 0, 1, 7, 8 correspond to i = 4k, i = 4k + 1, |
|  | $n_C = n_{SSB,i}$ | i = 4k + 2, i = 4k + 3 ($n_C = n_{SSB,i}$) |
|  | $SFN_C = SFN_{SSB,i}$ | 0, 3, 7, 10 correspond to i = 4k, i = 4k +1, |
|  | $n_C = n_{SSB,i}$ | i = 4k + 2 , i = 4k +3 ($n_C = n_{SSB,i}$) |
| 60 kHz | $SFN_C = SFN_{SSB,i}$ | 0, 1, 0, 1 correspond to i = 4k, i = 4k + 1, |
|  | $n_C = n_{SSB,i}$ | i = 4k + 2, i = 4k + 3($n_C = n_{SSB,i}$) |
|  | $SFN_C = SFN_{SSB,i}$ | 0, 6 or 7, 0, 6 or 7 correspond to i = 4k, |
|  | $n_C = n_{SSB,i}$ | i = 4k + 1, i = 4k + 2, i = 4k + 3($n_C = n_{SSB,i}$) |
|  | $SFN_C = SFN_{SSB,i}$ | 0, 2, 0, 2 correspond to i = 4k, i = 4k +1, |
|  | $n_C = n_{SSB,i}$ | i = 4k + 2, i = 4k +3 ($n_C = n_{SSB,i}$) |
|  | $SFN_C = SFN_{SSB,i}$ | 0, 6, 0, 6 correspond to i = 4k , i = 4k + 1, |
|  | $n_C = n_{SSB,i}$ | i = 4k + 2, i = 4k + 3 ($n_C = n_{SSB,i}$) |
| 120 kHz | $SFN_C = SFN_{SSB,i}$ | 0, 0 correspond to i = 4k, i = 4k + 2 |
|  | $n_C = n_{SSB,i}$ or | ($n_C = n_{SSB,i}$); |
|  | $n_C = n_{SSB,i} - 1$ | 1,1 correspond to i = 4k +1, i = 4k + 3 |
|  |  | ($n_C = n_{SSB,i} - 1$) |
|  | $SFN_C = SFN_{SSB,i}$ | 0, 0 or 1, 0, 0 or 1 correspond to i = 4k, |
|  | $n_C = n_{SSB,i}$ | i = 4k + 1, i = 4k + 2, i = 4k + 3($n_C = n_{SSB,i}$) |

TABLE 2-continued

Example correspondence between CORESETs and SSBs

| SCS | System Frame Number and Slot Number | The index of the first symbol ($k = 0, 1, \ldots, k_0$) |
|---|---|---|
| | $SFN_C = SFN_{SSB,i}$<br>$n_C = n_{SSB,i}$ or<br>$n_C = n_{SSB,i} - 1$ | 0, 0 correspond to $i = 4k$, $i = 4k + 2$<br>($n_C = n_{SSB,i}$); 2,2 correspond to $i = 4k + 1$, $i = 4k + 3$<br>($n_C = n_{SSB,i} - 1$) |
| | $SFN_C = SFN_{SSB,i}$<br>$n_C = n_{SSB,i}$ | 0, 0, 0, 0 correspond to $i = 4k$, $i = 4k + 1$,<br>$i = 4k + 2$, $i = 4k + 3(n_C = n_{SSB,i})$ |
| | $SFN_C = SFN_{SSB,i}$<br>$n_C = n_{SSB,i}$ or<br>$n_C = n_{SSB,i} - 1$) | 0, 0 correspond to $i = 4k$, $i = 4k + 2$<br>($n_C = n_{SSB,i}$); 3,3 correspond to $i = 4k + 1$, $i = 4k + 3$<br>($n_C = n_{SSB,i} - 1$) |
| 240 kHz | $SFN_C = SFN_{SSB,i}$<br>$n_C = n_{SSB,i}$ or<br>$n_C = n_{SSB,i} - 1$ | 0, 0 correspond to $i = 4k$, $i = 4k + 2$<br>($n_C = n_{SSB,i}$); 1, 1 correspond to $i = 4k + 1$, $i = 4k + 3$<br>($n_C = n_{SSB,i} - 1$) |
| | $SFN_C = SFN_{SSB,i}$<br>$n_C = n_{SSB,i}$ | 0, 0, 0, 0 correspond to $i = 4k$, $i = 4k + 1$,<br>$i = 4k + 2$, $i = 4k + 3(n_C = n_{SSB,i})$ |
| | $SFN_C = SFN_{SSB,i}$<br>$n_C = n_{SSB,i}$ | 0, 0 or 2, 0, 0 or 2 correspond to $i = 4k$,<br>$i = 4k + 1$, $i = 4k + 2$, $i = 4k + 3(n_C = n_{SSB,i})$ |

Table 2 summarizes the correspondence between the CORESETs and the SSBs discussed above.

The design described in this embodiment can determine the correspondence between the SSB index and the time domain location of the control resource set so that the SSB index with the SCS of 120 kHz can correspond to the time domain location of the control resource set with the SCS of 30, 60, and 120 kHz. The design can also be applied to other subcarrier spacings such as 60 kHz, 240 kHz, 480 kHz, and 960 kHz. The control resource set SCS corresponding to the SSB with the SCS of 60 kHz is 15, 30, 60 kHz. The control resource set SCS corresponding to the SSB with the SCS of 120 kHz is 30, 60, 120 kHz. The control resource set SCS corresponding to the SSB with the SCS of 480 kHz is 120, 240, 480 kHz. The control resource set SCS corresponding to the SSB with the SCS of 960 kHz is 240, 480, 960 kHz.

It is noted that, while the SSB structure described in Embodiment 2 is used as an example, other time domain structures of SSB can also be supported, and corresponding descriptions are not repeated.

Embodiment 11

This embodiment describes determining a correspondence of time-domain positions between an SSB and a CORESET. In this example, each SSB includes four consecutive symbols (e.g., OFDM symbols), and each slot includes 14 symbols using NCP. The slot index and the system frame number of the control resource set are $n_c$ and $SFN_c$ respectively. The slot index and the system frame number the SSB are $n_{SSB,i}$ and $SFN_{SSB,i}$ respectively, wherein i is an index of the SSB. The multiplexing mode of the SSB and the control resource set in this particular embodiment is Pattern2 as shown in FIG. 3B.

Figure 16A:
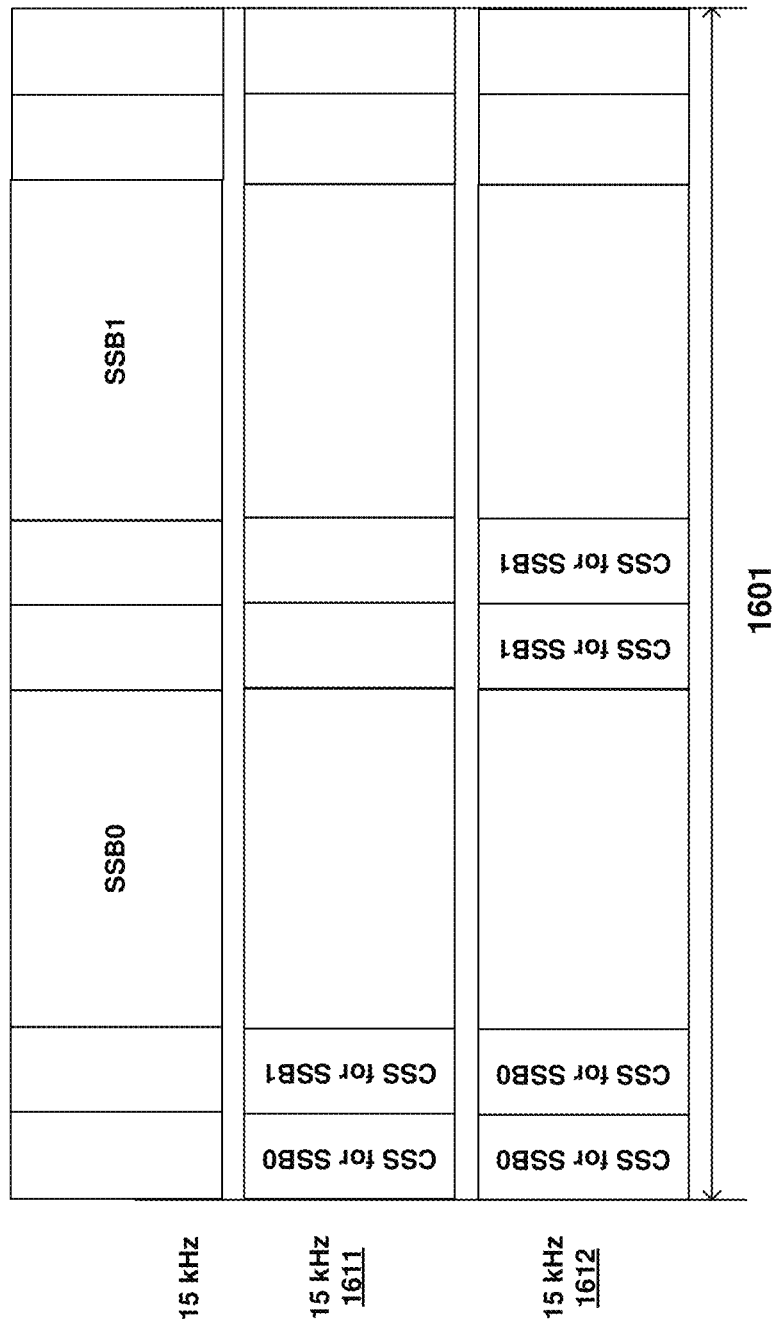
FIG. 16A illustrates an example correspondence between SSB of a subcarrier spacing of 15 kHz and the Control Resource Set (CORESET) of a subcarrier spacing of 15 kHz in accordance with one or more embodiments of the disclosed technology.
Figure 16B:
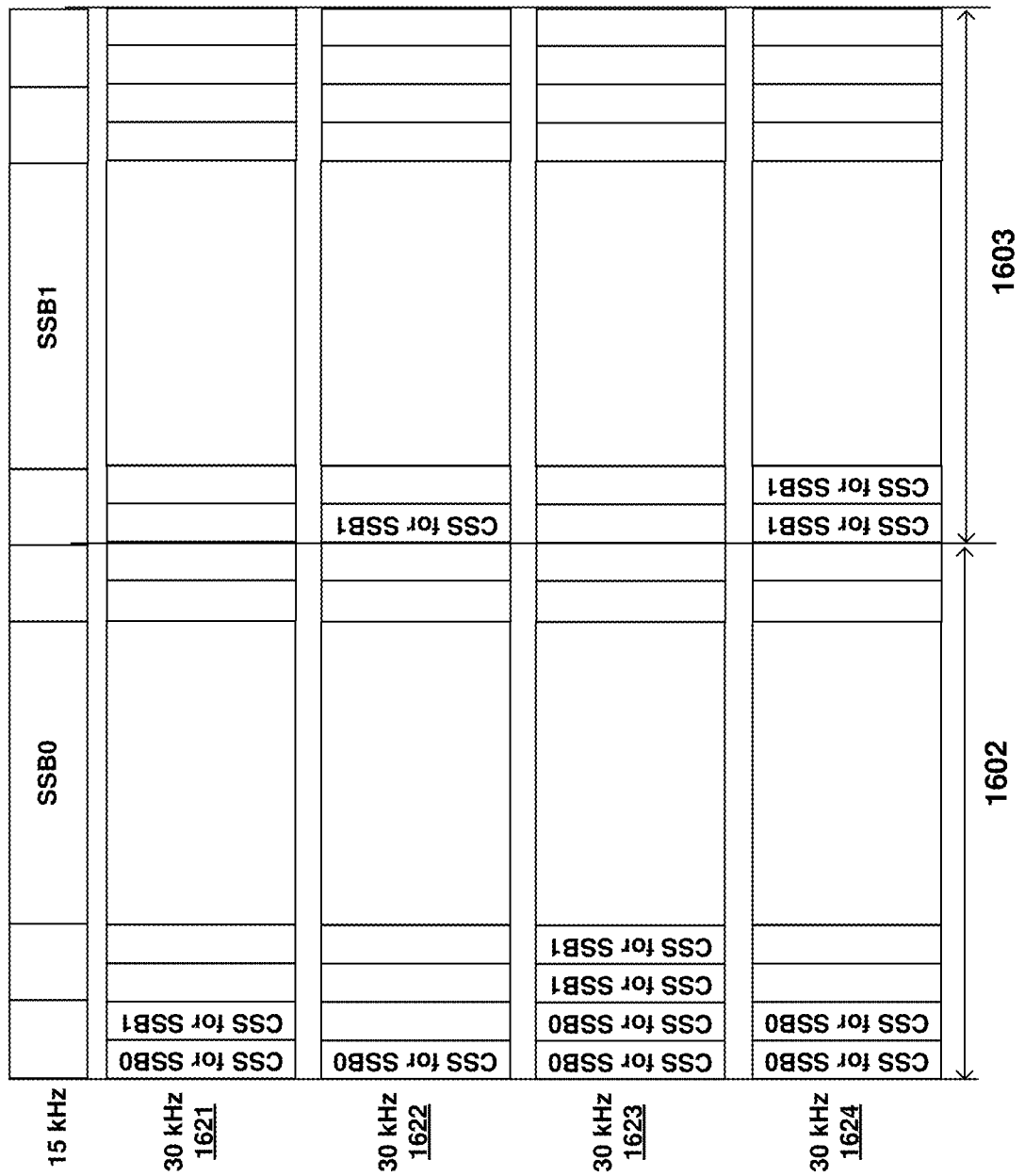
FIG. 16B illustrates an example correspondence between SSB of a subcarrier spacing of 15 kHz and the Control Resource Set (CORESET) of a subcarrier spacing of 30 kHz in accordance with one or more embodiments of the disclosed technology.

The SSB mapping shown in FIG. 2A is used in this embodiment as an example. FIGS. 16A-B illustrate the correspondence between SSB of SCS=15 kHz and the CORESET of SCS=15 and 30 kHz in accordance with one or more embodiments of the disclosed technology.

FIG. 16A illustrates a correspondence between the SSB of SCS=15 kHz and the control regions of SCS=15 kHz. For example, given a time-domain location of $SSB_i$, the slot index, system frame number, and the start symbol index of the CORESET can be determined based on the following rules:

1. In the first case of 1611, $SFN_c=SFN_{SSB,i}$. That is, the SSB and the corresponding control resource set are both located in the same radio frame. When $n_c=n_{SSB,i}$, the starting symbol indices of the control resource set are 0, 1 corresponding to $SSB_0$ and $SSB_1$ whose time-domain locations are within the time slot 1601. The indices correspond respectively to the SSBs whose indices satisfy i=2k, i=2k+1, where k={0, . . . , 2N+1} and N is an integer.

2. In the second case 1612, each CORESET occupies two symbols in the time domain. $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0, 6 corresponding to $SSB_0$ and $SSB_1$ whose time-domain locations are within the time slot 1601. The indices correspond respectively to the SSBs whose indices satisfy i=2k, i=2k+1, k={0, . . . , 2N+1} and N is an integer.

FIG. 16B illustrates four types of correspondence between the SSB of SCS=15 kHz and the control regions of SCS=30 kHz. For example, given a time-domain location of $SSB_i$, the slot index, system frame number, and the start symbol index of the CORESET can be determined based on the following rules:

1. In the first case 1621, $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol index of the control resource set is 0 corresponding to $SSB_0$ in slot 1602. The indices correspond respectively to the SSBs whose indices satisfy i=2k, where k={0, . . . , 2N+1} and N is an integer. When $n_c=n_{SSB,i}-1$, the starting symbol index of the control resource set is 1 corresponding to $SSB_0$ in slot 1603. The indices correspond respectively to the SSBs whose indices satisfy i=2k+1, where k={0, . . . , 2N+1} and N is an integer.

2. In the second case 1622, $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0 (corresponding to $SSB_0$ in slot 1602) and 0 (corresponding to $SSB_1$ in slot 1603). The indices correspond respectively to the SSBs whose indices satisfy i=2k, i=2k+1, where k={0, . . . , 2N+1} and N is an integer.

3. In the third case 1623, each CORESET occupies two symbols in the time domain. $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol index of the control resource set is 0 corresponding to $SSB_0$ in slot 1602. The indices correspond respectively to the SSBs whose indices satisfy i=2k, where k={0, . . . , 2N+1} and N is an integer. When $n_c=n_{SSB,i}-1$, the starting symbol index of the control resource set is 2 corresponding to $SSB_1$ in slot 1603. The indices correspond respectively to the SSBs whose indices satisfy i=2k+1, where k={0, . . . , 2N+1} and N is an integer.

4. In the fourth case 1624, each CORESET occupies two symbols in the time domain. $SFN_c=SFN_{SSB,i}$. That is, the SSB and the corresponding control resource set are both located in the same radio frame. When $n_c=n_{SSB,i}$ (that is, when the time-domain location of an SSB is within the time slot of the CORESET), the starting symbol indices of the control resource set are 0 (corresponding to $SSB_0$ in slot 1602) and 0 (corresponding to $SSB_1$ in slot 1603). The indices correspond respectively to the SSBs whose indices satisfy i=2k, i=2k+1, where k={0, . . . , 2N+1} and N is an integer.

Table 3 summarizes the correspondence between the CORESETs and SSBs discussed above.

TABLE 3

Example correspondence between CORESETs and SSBs

| SCS | System Frame Number and Slot Number | The index of the first symbol (k = 0, 1, . . . , $k_0$) |
|---|---|---|
| 15 kHz | $SFN_C = SFN_{SSB,i}$ $n_C = n_{SSB,i}$ | 0, 1 correspond to i = 2k, i = 2k + 1 ($n_C = n_{SSB,i}$) |
|  | $SFN_C = SFN_{SSB,i}$ $n_C = n_{SSB,i}$ | 0, 6 correspond to i = 2k, i = 2k + 1 ($n_C = n_{SSB,i}$) |
| 30 kHz | $SFN_C = SFN_{SSB,i}$ $n_C = n_{SSB,i}$ or $n_C = n_{SSB,i} - 1$ | 0 corresponds to i = 2k ($n_C = n_{SSB,i}$); 1 corresponds to i = 2k + 1 ($n_C = n_{SSB,i} - 1$) |
|  | $SFN_C = SFN_{SSB,i}$ $n_C = n_{SSB,i}$ | 0, 0 correspond to i =2k , i =2k + 1 ($n_C = n_{SSB,i}$) |
|  | $SFN_C = SFN_{SSB,i}$ $n_C = n_{SSB,i}$ or $n_C = n_{SSB,i} - 1$ | 0 corresponds to i = 2k ($n_C = n_{SSB,i}$); 2 corresponds to i = 2k + 1 ($n_C = n_{SSB,i} - 1$) |
|  | $SFN_C = SFN_{SSB,i}$ $n_C = n_{SSB,i}$ | 0, 0 correspond to i = 2k , i = 2k + 1 ($n_C = n_{SSB,i}$) |

The design described in this embodiment can determine the correspondence between the SSB index and the time domain location of the control resource set so that the SSB index with the SCS of 15 kHz can correspond to the control resource set position with the SCS of 15 and 30 kHz. The design can also be applied to other subcarrier spacings such as 30 kHz and 60 kHz.

It is noted that, while the SSB structure described in FIG. 2A is used as an example, other time domain structures of SSB can also be supported, and corresponding descriptions are not repeated.

Figure 17:
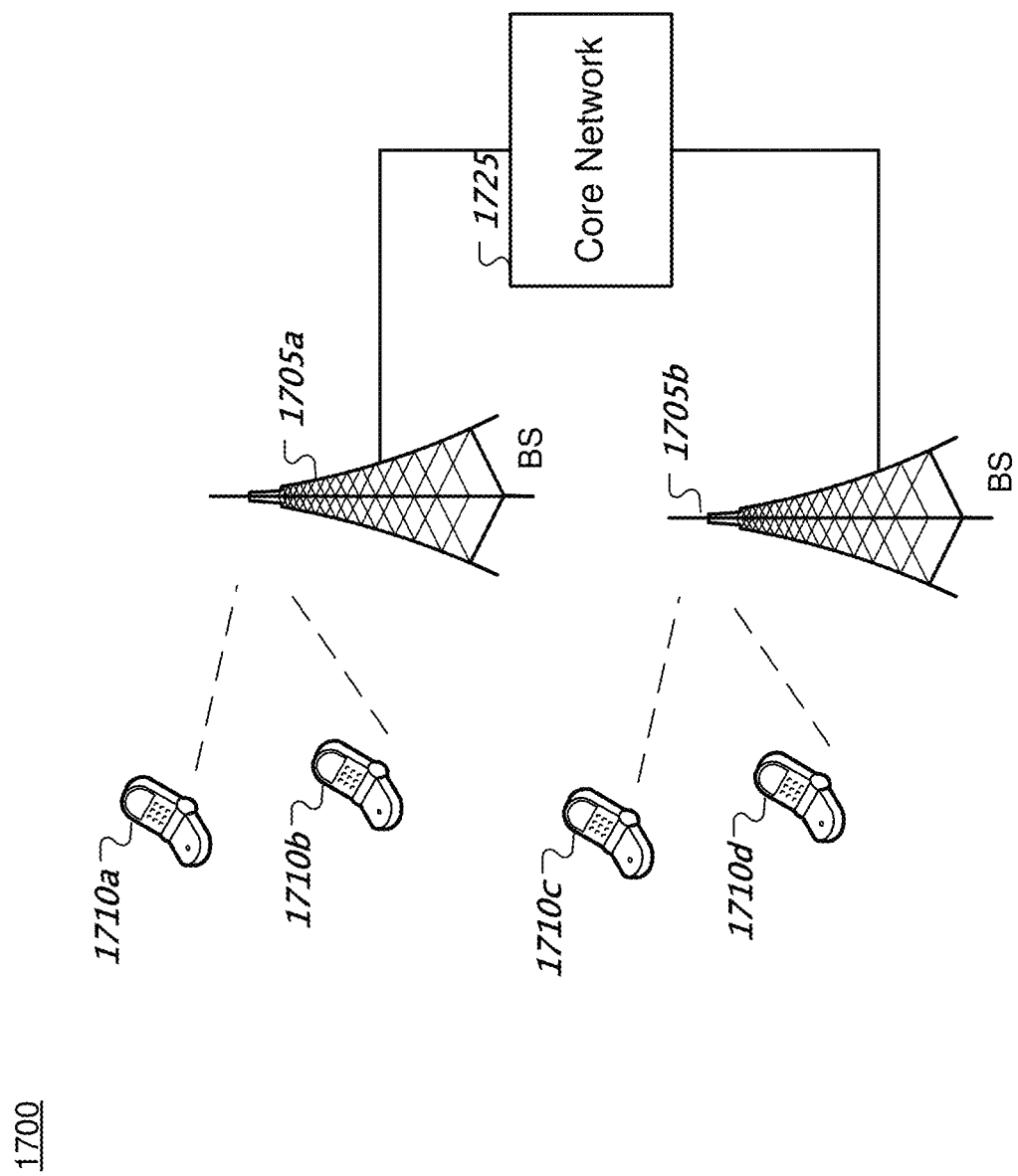
FIG. 17 shows an example of a wireless communication system where techniques in accordance with one or more embodiments of the present technology can be applied.

FIG. 17 shows an example of a wireless communication system 1700 where techniques in accordance with one or more embodiments of the present technology can be applied. A wireless communication system 1700 can include one or more base stations (BSs) 1705*a*, 1705*b*, one or more wireless devices 1710*a*, 1710*b*, 1710*c*, 1710*d*, and a core network 1725. A base station 1705*a*, 1705*b* can provide wireless service to wireless devices 1710*a*, 1710*b*, 1710*c* and 1710*d* in one or more wireless sectors. In some implementations, a base station 1705*a*, 1705*b* includes directional antennas to produce two or more directional beams to provide wireless coverage in different sectors.

The core network 1725 can communicate with one or more base stations 1705*a*, 1705*b*. The core network 1725 provides connectivity with other wireless communication systems and wired communication systems. The core network may include one or more service subscription databases to store information related to the subscribed wireless devices 1710*a*, 1710*b*, 1710*c*, and 1710*d*. A first base station 1705*a* can provide wireless service based on a first radio access technology, whereas a second base station 1705*b* can provide wireless service based on a second radio access technology. The base stations 1705*a* and 1705*b* may be co-located or may be separately installed in the field according to the deployment scenario. The wireless devices 1710*a*, 1710*b*, 1710*c*, and 1710*d* can support multiple different radio access technologies.

Figure 18:
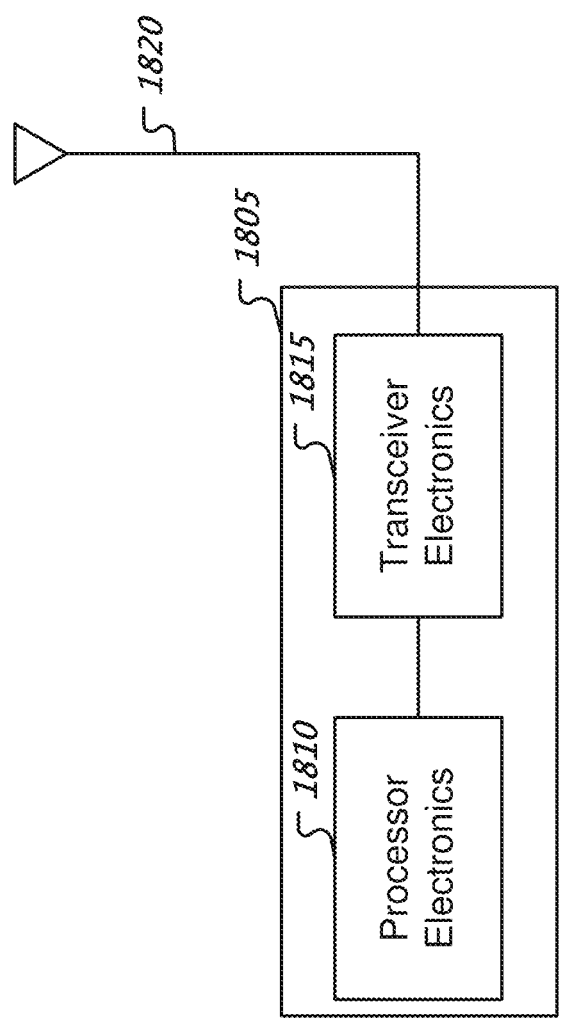
FIG. 18 is a block diagram representation of a portion of a radio station in accordance with one or more embodiments of the present technology can be applied.

FIG. 18 is a block diagram representation of a portion of a radio station. A radio station 1805 such as a base station or a wireless device (or UE) can include processor electronics 1810 such as a microprocessor that implements one or more of the wireless techniques presented in this document. The radio station 1805 can include transceiver electronics 1815 to send and/or receive wireless signals over one or more communication interfaces such as antenna 1820. The radio station 1805 can include other communication interfaces for transmitting and receiving data. Radio station 1805 can include one or more memories (not explicitly shown) configured to store information such as data and/or instructions. In some implementations, the processor electronics 1810 can include at least a portion of the transceiver electronics 1815. In some embodiments, at least some of the disclosed techniques, modules or functions are implemented using the radio station 1805.

It will be appreciated that the present document discloses techniques that can be embodied into wireless communication systems to provide SSB mappings for various subcarrier spacings and CP lengths, thereby providing compatibility when higher frequency spectrum is used for SSB transmissions. This patent document also describes the correspondence between SSBs and the control resource sets so that multiplexing of SSBs and control resource sets can be supported without additional cost.

In one example aspect, a wireless communication method is disclosed. The method includes mapping a synchronization signal block to multiple symbols having a first subcarrier spacing. The multiple symbols are from a set of non-consecutive candidate symbol groups. The method also includes generating a transmission pattern for a first time interval that includes the multiple symbols for the synchronization signal block. The first time interval includes half a radio frame, a radio frame, or multiple radio frames. The multiple symbols include but are not limited to OFDM symbols.

In some embodiments, the first subcarrier spacing is $\Delta f=2^\mu \cdot 15$ kHz, and wherein an index of a first symbol in each of the candidate symbol groups includes {8, 16, 20, 32, 36, 44}+n×56. μ is a non-negative integer and n is from a set that includes one or more non-negative integers.

In some embodiments, the first subcarrier spacing is $\Delta f=2^\mu \cdot 15$ kHz, and wherein an index of a first symbol in each of the candidate symbol groups includes {8, 16, 36, 44}+n×56. μ is a non-negative integer and n is from a set that includes one or more non-negative integers.

In some embodiments, the first subcarrier spacing is $\Delta f=2^\mu \cdot 15$ kHz, and an index of a first symbol in each of the candidate symbol groups includes $\{2, 6\}+n\times 12$, wherein $\mu$ and n are non-negative integers.

In some embodiments, the first subcarrier spacing is $\Delta f=2^\mu \cdot 15$ kHz, and an index of a first symbol in each of the candidate symbol groups includes at least one of $\{4, 14\}+n\times 24$, $\{4, 15\}+n\times 24$, $\{4, 161+n\times 24, 15, 14\}+n\times 24$, 15, $151+n\times 24$, 15, $161+n\times 24$, $\{6, 14\}+n\times 24$, $\{6, 15\}+n\times 24$, or $\{6, 16\}+n\times 24$. $\mu$ is a non-negative integer and n is from a set that includes one or more non-negative integers.

In some embodiments, the first subcarrier spacing is $\Delta f=2^\mu \cdot 15$ kHz, and an index of a first symbol in each of the candidate symbol groups includes $\{3, 7\}+n\times 14$. $\mu$ is a non-negative integer and n is from a set that includes one or more non-negative integers.

In some embodiments, the first subcarrier spacing is $\Delta f=2^\mu \cdot 15$ kHz, and an index of a first symbol in each of the candidate symbol groups includes at least one of 15, $151+n\times 28$, $\{5, 16\}+n\times 28$, $\{5, 17\}+n\times 28$, $\{6, 15\}+n\times 28$, $\{6, 16\}+n\times 28$, $\{6, 17\}+n\times 28$, $\{7, 15\}+n\times 28$, $\{7, 16\}+n\times 28$, or $\{7, 17\}+n\times 28$. $\mu$ is a non-negative integer and n is from a set that includes one or more non-negative integers.

In some embodiments, the first subcarrier spacing is $\Delta f=2^\mu \cdot 15$ kHz, and an index of a first symbol in each of the candidate symbol groups includes $\{1, 7\}+n\times 12$. $\mu$ is a non-negative integer and n is from a set that includes one or more non-negative integers.

In some embodiments, the first subcarrier spacing is $\Delta f=2^\mu \cdot 15$ kHz, and an index of a first symbol in each of the candidate symbol groups includes $\{2, 6\}+n\times 12$. $\mu$ is a non-negative integer and n is from a set that includes one or more non-negative integers.

In another example aspect, a wireless communication method is disclosed. The method includes mapping synchronization data onto multiple synchronization symbol blocks within a first time interval having a first subcarrier spacing. The method includes mapping multiple control resource sets to a second time interval having a second subcarrier spacing. The multiple control resource sets are configured according to a control resource set period that includes one or more slots, and each synchronization symbol block has a one-to-one correspondence with each set of the multiple control resource sets. The method also includes generating a transmission pattern for the first time interval and the second time interval.

The first time interval and the second time interval includes half a radio frame, a radio frame, or multiple radio frames. In some embodiments, the first time interval and the second time interval have one or more same system frame numbers. In some embodiments, the first subcarrier spacing is different than the second subcarrier spacing. In some embodiments, the first subcarrier spacing and the second subcarrier spacing are same.

In some embodiments, the first subcarrier spacing is $\Delta f=2^{\mu+2}\cdot 15$ kHz and the second subcarrier spacing is $\Delta f=2^\mu \cdot 15$ kHz. The control resource set period includes one slot, and the multiple control resource sets and the multiple synchronization symbol blocks are within the same slot. An index of a first symbol of a control resource set includes 0, 1, 3, 6, 7, or 10 in the first slot, and wherein an index of a corresponding synchronization symbol block includes 6k, 6k+1, 6k+2, 6k+3, 6k+4, or 6k+5, k being a non-negative integer.

In some embodiments, the first subcarrier spacing is $\Delta f=2^{\mu+1}\cdot 15$ kHz and the second subcarrier spacing is $\Delta f=2^\mu \cdot 15$ kHz. The control resource set period includes two slots. An index of a first symbol of a control resource set includes 0, 1, or 2 in a first slot and 0 or 1 in a second slot, and an index of a corresponding synchronization symbol block includes 6k, 6k+1, 6k+2, 6k+4, or 6k+5 when the control resource set and the corresponding synchronization symbol block are in a same slot. An index of a first symbol of a control resource set includes 13 in the first slot, and an index of a corresponding synchronization symbol block includes 6k+3 when the control resource set and the corresponding synchronization symbol block are in different slots. k is a non-negative integer.

In some embodiments, the first subcarrier spacing is $\Delta f=2^{\mu+1}\cdot 15$ kHz and the second subcarrier spacing is $\Delta f=2^\mu \cdot 15$ kHz. The control resource set period includes two slots. An index of a first symbol of a control resource set includes 0, 6, or 7 in a first slot and 0, 1, 6, or 7 in a second slot, and an index of a corresponding synchronization symbol block includes 6k, 6k+1, 6k+2, 6k+3, 6k+4, or 6k+5, the control resource set and the corresponding synchronization symbol block being in a same slot. k is a non-negative integer.

In some embodiments, the first subcarrier spacing is $\Delta f=2^{\mu+1}\cdot 15$ kHz and the second subcarrier spacing is $\Delta f=2^\mu \cdot 15$ kHz. The control resource set period includes two slots. An index of a first symbol of a control resource set includes 0, 2, or 6 in a first slot and 0 or 6 in a second slot, and an index of a corresponding synchronization symbol block includes 6k, 6k+1, 6k+2, 6k+4, or 6k+5 when the control resource set and the corresponding synchronization symbol block are in a same slot. An index of a first symbol of a control resource set includes 12 in the first slot, and an index of a corresponding synchronization symbol block includes 6k+3 when the control resource set and the corresponding synchronization symbol block are in different slots. k is a non-negative integer.

In some embodiments, the first subcarrier spacing and the second subcarrier spacing are $\Delta f=2^\mu \cdot 15$ kHz. The control resource set period includes four slots. An index of a first symbol of a control resource set includes 0 in a first slot and 0 or 1 in a second slot, and an index of a corresponding synchronization symbol block includes 6k, 6k+3, or 6k+4 when the control resource set and the corresponding synchronization symbol block are in a same slot. An index of a first symbol of a control resource set includes 1 or 2 in a third slot and 2 in a fourth slot, and an index of a corresponding synchronization symbol block includes 6k+1, 6k+2, or 6k+5 when the control resource set and the corresponding synchronization symbol block are in two adjacent slots. k is a non-negative integer. The third slot may be the same or different than the first and/or second slots. The fourth slot may be the same or different than the first and/or second slot.

In some embodiments, the first subcarrier spacing and the second subcarrier spacing are $\Delta f=2^\mu \cdot 15$ kHz. The control resource set period includes four slots. An index of a first symbol of a control resource set includes 0 in a first slot, 0 or 1 in a second slot, 0 or 1 in a third slot, and 0 or 1 in a fourth slot, and an index of a corresponding synchronization symbol block includes 6k, 6k+1, 6k+2, 6k+3, 6k+4, or 6k+5, the control resource set and the corresponding synchronization symbol block being in a same slot. k is a non-negative integer.

In some embodiments, the first subcarrier spacing and the second subcarrier spacing are $\Delta f=2^\mu \cdot 15$ kHz. The control resource set period includes four slots. An index of a first symbol of a control resource set includes 0 in a first slot, 0 or 2 in a second slot, and 0 in a third slot, and an index of a corresponding synchronization symbol block includes 6k, 6k+3, 6k+4, or 6k+5 when the control resource set and the corresponding synchronization symbol block are in a same slot. An index of a first symbol of a control resource set includes 2 or 4 in a fourth slot, and an index of a corresponding synchronization symbol block includes 6k+1 or 6k+2 when the control resource set and the corresponding synchronization symbol block are in two adjacent slots. k is a non-negative integer. The fourth slot may be the same or different than the first, the second, and/or the third slot.

In some embodiments, the first subcarrier spacing and the second subcarrier spacing are $\Delta f=2^{\mu}\cdot 15$ kHz. The control resource set period includes four slots. An index of a first symbol of a control resource set includes 0 in a first slot, 0 in a second slot, 0 or 2 in a third slot, and 0 in a fourth slot, and an index of a corresponding synchronization symbol block includes 6k, 6k+2, 6k+3, 6k+4, or 6k+5 when the control resource set and the corresponding synchronization symbol block are in a same slot. An index of a first symbol of a control resource set includes 12 in the first slot, the second, or the third slot, and an index of a corresponding synchronization symbol block includes 6k+1 when the control resource set and the corresponding synchronization symbol block are in two adjacent slots. k is a non-negative integer.

In some embodiments, the first subcarrier spacing is $\Delta f=2^{\mu+2}\cdot 15$ kHz and the second subcarrier spacing is $\Delta f=2^{\mu}\cdot 15$ kHz. The control resource set period includes one slot, and the multiple control resource sets and the multiple synchronization symbol blocks are within the same slot. An index of a first symbol of a control resource set includes 0, 1, 7, or 8 in the slot, and an index of a corresponding synchronization symbol block includes 4k, 4k+1, 4k+2, or 4k+3. k is a non-negative integer.

In some embodiments, the first subcarrier spacing is $\Delta f=2^{\mu+2}\cdot 15$ kHz and the second subcarrier spacing is $\Delta f=2^{\mu}\cdot 15$ kHz. The control resource set period includes one slot and the multiple control resource sets and the multiple synchronization symbol blocks are within the same slot. An index of a first symbol of a control resource set includes 0, 3, 7, or 10 in the slot, and an index of a corresponding synchronization symbol block includes 4k, 4k+1, 4k+2, or 4k+3. k is a non-negative integer.

In some embodiments, the first subcarrier spacing is $\Delta f=2^{\mu+1}\cdot 15$ kHz and the second subcarrier spacing is $\Delta f=2^{\mu}\cdot 15$ kHz. The control resource set period includes two slots. An index of a first symbol of a control resource set includes 0 or 1 in a first slot and 0 or 1 in a second slot, and an index of a corresponding synchronization symbol block includes 4k, 4k+1, 4k+2, or 4k+3, the control resource set and the corresponding synchronization symbol block being in a same slot. k is a non-negative integer.

In some embodiments, the first subcarrier spacing is $\Delta f=2^{\mu+1}\cdot 15$ kHz and the second subcarrier spacing is $\Delta f=2^{\mu}\cdot 15$ kHz. The control resource set period includes two slots. An index of a first symbol of a control resource set includes 0, 6, or 7 in a first slot, and 0, 6, or 7 in a second slot, and an index of a corresponding synchronization symbol block includes 4k, 4k+1, 4k+2, or 4k+3, the control resource set and the corresponding synchronization symbol block being in a same slot. k is a non-negative integer.

In some embodiments, the first subcarrier spacing is $\Delta f=2^{\mu+1}\cdot 15$ kHz and the second subcarrier spacing is $\Delta f=2^{\mu}\cdot 15$ kHz. The control resource set period includes two slots. An index of a first symbol of a control resource set includes 0 or 2 in a first slot, and 0 or 2 in a second slot, and an index of a corresponding synchronization symbol block includes 4k, 4k+1, 4k+2, or 4k+3, the control resource set and the corresponding synchronization symbol block being in a same slot. k is a non-negative integer.

In some embodiments, the first subcarrier spacing is $\Delta f=2^{\mu+1}\cdot 15$ kHz and the second subcarrier spacing is $\Delta f=2^{\mu}\cdot 15$ kHz. The control resource set period includes two slots. An index of a first symbol of a control resource set includes 0 or 6 in a first slot, and 0 or 6 in a second slot, and an index of a corresponding synchronization symbol block includes 4k, 4k+1, 4k+2, or 4k+3, the control resource set and the corresponding synchronization symbol block being in a same slot. k is a non-negative integer.

In some embodiments, the first subcarrier spacing and the second subcarrier spacing are $\Delta f=2^{\mu}\cdot 15$ kHz. The control resource set period includes four slots. An index of a first symbol of a control resource set includes 0 in a first slot and 0 in a second slot, and an index of a corresponding synchronization symbol block includes 4k or 4k+2 when the control resource set and the corresponding synchronization symbol block are in a same slot. An index of a first symbol of a control resource set includes 1 in a third slot and 1 in a fourth slot, and an index of a corresponding synchronization symbol block includes 4k+1 or 4k+3 when the control resource set and the corresponding synchronization symbol block are in two adjacent slots. k is a non-negative integer. The third slot may be the same or different than the first and/or second slots. The fourth slot may be the same or different than the first and/or second slot.

In some embodiments, the first subcarrier spacing and the second subcarrier spacing are $\Delta f=2^{\mu}\cdot 15$ kHz. The control resource set period includes four slots. An index of a first symbol of a control resource set includes 0 in a first slot, 0 or 1 in a second slot, 0 in a third slot, and 0 or 1 in a fourth slot, and an index of a corresponding synchronization symbol block includes 4k, 4k+1, 4k+2, or 4k+3, the control resource set and the corresponding synchronization symbol block being in a same slot. k is a non-negative integer.

In some embodiments, the first subcarrier spacing and the second subcarrier spacing are $\Delta f=2^{\mu}\cdot 15$ kHz. The control resource set period includes four slots. An index of a first symbol of a control resource set includes 0 in a first slot and 0 in a second slot, and an index of a corresponding synchronization symbol block includes 4k or 4k+2 when the control resource set and the corresponding synchronization symbol block are in a same slot. An index of a first symbol of a control resource set includes 1, 2, or 3 in a third slot, and 1, 2, or 3 in a fourth slot, and an index of a corresponding synchronization symbol block includes 4k+1 or 4k+3 when the control resource set and the corresponding synchronization symbol block are in two adjacent slots. k is a non-negative integer. The third slot may be the same or different than the first and/or second slots. The fourth slot may be the same or different than the first and/or second slot.

In some embodiments, the first subcarrier spacing is $\Delta f=2^{\mu}\cdot 15$ kHz and the second subcarrier spacing is $\Delta f=2^{\mu+1}\cdot 15$ kHz. The control resource set period includes four slots. An index of a first symbol of a control resource set includes 0 in a first slot and 0 in a second slot, and an index of a corresponding synchronization symbol block includes 4k or 4k+2 when the control resource set and the corresponding synchronization symbol block are in a same slot. An index of a first symbol of a control resource set includes 1 in a third slot and 1 in a fourth slot, and an index of a corresponding synchronization symbol block includes 4k+1 or 4k+3 when the control resource set and the corresponding synchronization symbol block are in two adjacent slots. k is a non-negative integer. The third slot may be the same or different than the first and/or second slots. The fourth slot may be the same or different than the first and/or second slot.

In some embodiments, the first subcarrier spacing is $\Delta f=2^\mu \cdot 15$ kHz and the second subcarrier spacing is $\Delta f=2^{\mu+1} \cdot 15$ kHz. The control resource set period includes four slots. An index of a first symbol of a control resource set includes 0 in a first slot, 0 or 2 in a second slot, 0 in a third slot, and 0 or 2 in a fourth slot, and an index of a corresponding synchronization symbol block includes 4k, 4k+1, 4k+2, or 4k+3, the control resource set and the corresponding synchronization symbol block being in a same slot. k is a non-negative integer.

In some embodiments, the first subcarrier spacing and the second subcarrier spacing are $\Delta f=2^\mu \cdot 15$ kHz. The control resource set period includes one slot, and the multiple control resource sets and the multiple synchronization symbol blocks are within the same slot. An index of a first symbol of a control resource set includes 0 or 1 in the slot, and an index of a corresponding synchronization symbol block includes 2k or 2k+1. k is a non-negative integer.

In some embodiments, the first subcarrier spacing and the second subcarrier spacing are $\Delta f=2^\mu \cdot 15$ kHz. The control resource set period includes one slot, and the multiple control resource sets and the multiple synchronization symbol blocks are within the same slot. An index of a first symbol of a control resource set includes 0 or 6 in the slot, and an index of a corresponding synchronization symbol block includes 2k or 2k+1. k is a non-negative integer.

In some embodiments, the first subcarrier spacing is $\Delta f=2^\mu \cdot 15$ kHz and the second subcarrier spacing is $\Delta f=2^{\mu+1} \neq 15$ kHz. The control resource set period includes two slots. An index of a first symbol of a control resource set includes 0 in a first slot, and an index of a corresponding synchronization symbol block includes 2k when the control resource set and the corresponding synchronization symbol block being in a same slot. An index of a first symbol of a control resource set includes 1 or 2 in a second slot, and an index of a corresponding synchronization symbol block includes 2k+1 when the control resource set and the corresponding synchronization symbol block are in different slots. k is a non-negative integer. The second slot may be the same or different than the first slot.

In some embodiments, the first subcarrier spacing is $\Delta f=2^\mu \cdot 15$ kHz and the second subcarrier spacing is $\Delta f=2^\mu \cdot 15$ kHz. The control resource set period includes two slots. An index of a first symbol of a control resource set includes 0 in a first slot and 0 in a second slot, and an index of a corresponding synchronization symbol block includes 2k or 2k+1, the control resource set and the corresponding synchronization symbol block being in a same slot. k is a non-negative integer.

In another example aspect, a communication apparatus includes a processor configured to implement the methods described above.

In yet another example aspect, a computer program product having code stored thereon is disclosed. The code upon execution causes the processor to implement the methods described above.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
   mapping synchronization data onto multiple synchronization signal blocks mapped onto adjacent slots within a first time interval in which transmissions have a first subcarrier spacing;
   mapping multiple control resource sets to a second time interval in which transmissions have a second subcarrier spacing, wherein the multiple control resource sets are configured according to a control resource set period corresponding to a number of slots that is greater than one, the multiple control resource sets mapped onto adjacent slots within the control resource set period, and wherein each synchronization signal block has a one-to-one correspondence with each set of the multiple control resource sets;
   determining an index of a first symbol of a control resource set of the multiple control resource sets based on whether the control resource set and a corresponding synchronization signal block of the multiple synchronization signal blocks are in a same slot or in different slots;
   generating a transmission pattern for the first time interval and the second time interval; and
   performing a transmission according to the transmission pattern.

2. The method of claim 1, wherein the first subcarrier spacing is different than the second subcarrier spacing.

3. The method of claim 1, wherein the first subcarrier spacing is $\Delta f=2^{\mu+1}\cdot 15$ kHz and the second subcarrier spacing is $\Delta f=2^{\mu}\cdot 15$ kHz, where $\mu$ is a non-negative integer,
   wherein the control resource set period includes two slots,
   wherein the index of the first symbol of the control resource set includes 0, 1, or 2 in a first slot and 0 or 1 in a second slot, and an index of the corresponding synchronization signal block includes 6k, 6k+1, 6k+2, 6k+4, or 6k+5 when the control resource set and the corresponding synchronization signal block are in the same slot, or
   wherein the index of the first symbol of the control resource set includes 13 in the first slot, and the index of the corresponding synchronization signal block includes 6k+3 when the control resource set and the corresponding synchronization signal block are in different slots, or
   wherein the index of the first symbol of the control resource set includes 0, 6, or 7 in the first slot and 0, 1, 6, or 7 in the second slot, and the index of the corresponding synchronization signal block includes 6k, 6k+1, 6k+2, 6k+3, 6k+4, or 6k+5, the control resource set and the corresponding synchronization signal block being in the same slot, or
   wherein the index of the first symbol of the control resource set includes 0, 2, or 6 in the first slot and 0 or 6 in the second slot, and the index of the corresponding synchronization signal block includes 6k, 6k+1, 6k+2, 6k+4, or 6k+5 when the control resource set and the corresponding synchronization signal block are in the same slot, or
   wherein the index of the first symbol of the control resource set includes 12 in the first slot, and the index of the corresponding synchronization signal block includes 6k+3 when the control resource set and the corresponding synchronization signal block are in different slots,
   wherein k is a non-negative integer.

4. The method of claim 1, wherein the first subcarrier spacing and the second subcarrier spacing are $\Delta f=2^{\mu}\cdot 15$ kHz, where u is a non-negative integer,
   wherein the control resource set period includes four slots,
   wherein the index of the first symbol of the control resource set includes 0 in a first slot and 0 or 1 in a second slot, and an index of the corresponding synchronization signal block includes 6k, 6k+3, or 6k+4 when the control resource set and the corresponding synchronization signal block are in the same slot, or
   wherein the index of the first symbol of the control resource set includes 1 or 2 in a third slot and 2 in a fourth slot, and the index of the corresponding synchronization signal block includes 6k+1, 6k+2, or 6k+5 when the control resource set and the corresponding synchronization signal block are in two adjacent slots, or
   wherein the index of the first symbol of the control resource set includes 0 in the first slot, 0 or 1 in the second slot, 0 or 1 in the third slot, and 0 or 1 in the fourth slot, and the index of a corresponding synchronization signal block includes 6k, 6k+1, 6k+2, 6k+3, 6k+4, or 6k+5, the control resource set and the corresponding synchronization signal block being in the same slot, or
   wherein the index of the first symbol of the control resource set includes 0 in the first slot, 0 or 2 in the second slot, and 0 in the third slot, and the index of a corresponding synchronization signal block includes 6k, 6k+3, 6k+4, or 6k+5 when the control resource set and the corresponding synchronization signal block are in the same slot, or
   wherein the index of the first symbol of the control resource set includes 2 or 4 in the fourth slot, and the index of a corresponding synchronization signal block includes 6k+1 or 6k+2 when the control resource set and the corresponding synchronization signal block are in two adjacent slots, or wherein the index of the first symbol of the control resource set includes 0 in the first slot, 0 in the second slot, 0 or 2 in a third slot, and 0 in the fourth slot, and the index of a corresponding synchronization signal block includes 6k, 6k+2, 6k+3, 6k+4, or 6k+5 when the control resource set and the corresponding synchronization signal block are in the same slot, or wherein the index of the first symbol of the control resource set includes 12 in the first, the second, or the third slot, and the index of a corresponding synchronization signal block includes 6k+1 when the control resource set and the corresponding synchronization signal block are in two adjacent slots, or wherein the index of the first symbol of the control resource set includes 0 in the first slot and 0 in the second slot, and the index of a corresponding synchronization signal block includes 4k or 4k+2 when the control resource set and the corresponding synchronization signal block are in the same slot, or wherein the index of the first symbol of the control resource set includes 1 in the third slot and 1 in the fourth slot, and the index of a corresponding synchronization signal block includes 4k+1 or 4k+3 when the control resource set and the corresponding synchronization signal block are in two adjacent slots, or wherein the index of the first symbol of the control resource set includes 0 in the first slot, 0 or 1 in the second slot, 0 in the third slot, and 0 or 1 in the fourth slot, and the index of a corresponding synchronization signal block includes 4k, 4k+1, 4k+2, or 4k+3, the control resource set and the corresponding synchronization signal block being in the same slot, or wherein the index of the first symbol of the control resource set includes 0 in the first slot and 0 in the second slot, and the index of a corresponding synchronization signal block includes 4k or 4k+2 when the control resource set and the corresponding synchronization signal block are in the same slot, or wherein the index of the first symbol of the control resource set includes 1, 2, or 3 in the third slot, and 1, 2, or 3 in the fourth slot, and the index of a corresponding synchronization signal block includes 4k+1 or 4k+3 when the control resource set and the corresponding synchronization signal block are in two adjacent slots, wherein k is a non-negative integer.

5. The method of claim 1, wherein the first subcarrier spacing is $\Delta f=2^{\mu+1}\cdot 15$ kHz and the second subcarrier spacing is $\Delta f=2^{\mu}\cdot 15$ kHz, where u is a non-negative integer, wherein the control resource set period includes two slots, wherein the index of the first symbol of the control resource set includes 0 or 1 in a first slot and 0 or 1 in a second slot, and an index of the corresponding synchronization signal block includes 4k, 4k+1, 4k+2, or 4k+3, the control resource set and the corresponding synchronization signal block being in the same slot, or wherein the index of a first symbol of the control resource set includes 0, 6, or 7 in the first slot, and 0, 6, or 7 in the second slot, and wherein the index of the corresponding synchronization signal block includes 4k, 4k+1, 4k+2, or 4k+3, the control resource set and the corresponding synchronization signal block being in the same slot, or wherein the index of the first symbol of the control resource set includes 0 or 2 in the first slot, and 0 or 2 in the second slot, and wherein the index of the same slot, or wherein the index of the first symbol of the control resource set includes 0 or 6 in the first slot, and 0 or 6 in the second slot, and wherein the index of a corresponding synchronization signal block includes 4k, 4k+1, 4k+2, or 4k+3, the control resource set and the corresponding synchronization signal block being in the same slot, wherein k is a non-negative integer.

6. The method of claim 1, wherein the first subcarrier spacing is $\Delta f=2^{\mu}\cdot 15$ kHz and the second subcarrier spacing is $\Delta f=2^{\mu+1}\cdot 15$ kHz, where u is a non-negative integer, wherein the control resource set period includes four slots, wherein the index of the first symbol of the control resource set includes 0 in a first slot and 0 in a second slot, and an index of the corresponding synchronization signal block includes 4k or 4k+2 when the control resource set and the corresponding synchronization signal block are in the same slot, or wherein the index of the first symbol of the control resource set includes 1 in a third slot and 1 in a fourth slot, and the index of the corresponding synchronization signal block includes 4k+1 or 4k+3 when the control resource set and the corresponding synchronization signal block are in two adjacent slots, or wherein the index of the first symbol of the control resource set includes 0 in the first slot, 0 or 2 in the second slot, 0 in the third slot, and 0 or 2 in the fourth slot, and an index of a corresponding synchronization signal block includes 4k, 4k+1, 4k+2, or 4k+3, the control resource set and the corresponding synchronization signal block being in the same slot, wherein k is a non-negative integer.

7. The method of claim 1, wherein the first subcarrier spacing is $\Delta f=2^{\mu}\cdot 15$ kHz and the second subcarrier spacing is $\Delta f=2^{\mu+1}\cdot 15$ kHz, where u is a non-negative integer, wherein the control resource set period includes two slots, wherein the index of the first symbol of the control resource set includes 0 in a first slot, and an index of the corresponding synchronization signal block includes 2k when the control resource set and the corresponding synchronization signal block being in the same slot, or wherein the index of the first symbol of the control resource set includes 1 or 2 in a second slot, and the index of the corresponding synchronization signal block includes 2k+1 when the control resource set and the corresponding synchronization signal block are in different slots, or wherein the index of the first symbol of the control resource set includes 0 in the first slot and 0 in the second slot, and the index of the corresponding synchronization signal block includes 2k or 2k+1, the control resource set and the corresponding synchronization signal block being in the same slot, wherein k is a non-negative integer.

8. A communication apparatus, comprising:
a processor configured to:
map synchronization data onto multiple synchronization signal blocks mapped onto adjacent slots within a first time interval in which transmissions have a first subcarrier spacing;
map multiple control resource sets to a second time interval in which transmissions have a second subcarrier spacing, wherein the multiple control resource sets are configured according to a control resource set period corresponding to a number of slots that is greater than one, the multiple control resource sets mapped onto adjacent slots within the control resource set period, and wherein each synchronization signal block has a one-to-one correspondence with each set of the multiple control resource sets;

determine an index of a first symbol of a control resource set of the multiple control resource sets based on whether the control resource set and a corresponding synchronization signal block of the multiple synchronization signal blocks are in a same slot or in different slots;

generate a transmission pattern for the first time interval and the second time interval; and perform a transmission according to the transmission pattern.

9. The apparatus of claim 8, wherein the first subcarrier spacing is different than the second subcarrier spacing.

10. The apparatus of claim 8, wherein the first subcarrier spacing is $\Delta f = 2^{\mu+1} \cdot 15$ kHz and the second subcarrier spacing is $\Delta f = 2^{\mu} \cdot 15$ kHz, where u is a non-negative integer, wherein the control resource set period includes two slots, wherein the index of the first symbol of the control resource set includes 0, 1, or 2 in a first slot and 0 or 1 in a second slot, and an index of the corresponding synchronization signal block includes 6k, 6k+1, 6k+2, 6k+4, or 6k+5 when the control resource set and the corresponding synchronization signal block are in the same slot, or wherein the index of the first symbol of the control resource set includes 13 in the first slot, and the index of the corresponding synchronization signal block includes 6k+3 when the control resource set and the corresponding synchronization signal block are in different slots, or wherein the index of the first symbol of the control resource set includes 0, 6, or 7 in the first slot and 0, 1, 6, or 7 in the second slot, and the index of the corresponding synchronization signal block includes 6k, 6k+1, 6k+2, 6k+3, 6k+4, or 6k+5, the control resource set and the corresponding synchronization signal block being in the same slot, or wherein the index of the first symbol of the control resource set includes 0, 2, or 6 in the first slot and 0 or 6 in the second slot, and the index of the corresponding synchronization signal block includes 6k, 6k+1, 6k+2, 6k+4, or 6k+5 when the control resource set and the corresponding synchronization signal block are in the same slot, or wherein the index of the first symbol of the control resource set includes 12 in the first slot, and the index of the corresponding synchronization signal block includes 6k+3 when the control resource set and the corresponding synchronization signal block are in different slots, wherein k is a non-negative integer.

11. The apparatus of claim 8, wherein the first subcarrier spacing and the second subcarrier spacing are $\Delta f = 2^{\mu} \cdot 15$ kHz, where u is a non-negative integer, wherein the control resource set period includes four slots, wherein the index of the first symbol of the control resource set includes 0 in a first slot and 0 or 1 in a second slot, and an index of the corresponding synchronization signal block includes 6k, 6k+3, or 6k+4 when the control resource set and the corresponding synchronization signal block are in the same slot, or wherein the index of the first symbol of the control resource set includes 1 or 2 in a third slot and 2 in a fourth slot, and the index of the corresponding synchronization signal block includes 6k+1, 6k+2, or 6k+5 when the control resource set and the corresponding synchronization signal block are in two adjacent slots, or wherein the index of the first symbol of the control resource set includes 0 in the first slot, 0 or 1 in the second slot, 0 or 1 in the third slot, and 0 or 1 in the fourth slot, and the index of the corresponding synchronization signal block includes 6k, 6k+1, 6k+2, 6k+3, 6k+4, or 6k+5, the control resource set and the corresponding synchronization signal block being in the same slot, or wherein the index of the first symbol of the control resource set includes 0 in the first slot, 0 or 2 in the second slot, and 0 in the third slot, and the index of the corresponding synchronization signal block includes 6k, 6k+3, 6k+4, or 6k+5 when the control resource set and the corresponding synchronization signal block are in the same slot, or wherein the index of the first symbol of the control resource set includes 2 or 4 in the fourth slot, and the index of the corresponding synchronization signal block includes 6k+1 or 6k+2 when the control resource set and the corresponding synchronization signal block are in two adjacent slots, or wherein the index of the first symbol of the control resource set includes 0 in the first slot, 0 in the second slot, 0 or 2 in the third slot, and 0 in the fourth slot, and the index of the corresponding synchronization signal block includes 6k, 6k+2, 6k+3, 6k+4, or 6k+5 when the control resource set and the corresponding synchronization signal block are in the same slot, or wherein the index of the first symbol of the control resource set includes 12 in the first, the second, or the third slot, and the index of the corresponding synchronization signal block includes 6k+1 when the control resource set and the corresponding synchronization signal block are in two adjacent slots, or wherein the index of the first symbol of the control resource set includes 0 in the first slot and 0 in the second slot, and the index of the corresponding synchronization signal block includes 4k or 4k+2 when the control resource set and the corresponding synchronization signal block are in the same slot, or wherein the index of the first symbol of the control resource set includes 1 in the third slot and 1 in the fourth slot, and the index of the corresponding synchronization signal block includes 4k+1 or 4k+3 when the control resource set and the corresponding synchronization signal block are in two adjacent slots, or wherein the index of the first symbol of a control resource set includes 0 in the first slot, 0 or 1 in the second slot, 0 in the third slot, and 0 or 1 in the fourth slot, and the index of a corresponding synchronization signal block includes 4k, 4k+1, 4k+2, or 4k+3, the control resource set and the corresponding synchronization signal block being in the same slot, or wherein the index of the first symbol of the control resource set includes 0 in the first slot and 0 in the second slot, and the index of the corresponding synchronization signal block includes 4k or 4k+2 when the control resource set and the corresponding synchronization signal block are in the same slot, or wherein the index of the first symbol of the control resource set includes 1, 2, or 3 in the third slot, and 1, 2, or 3 in the fourth slot, and the index of corresponding synchronization signal block includes 4k+1 or 4k+3 when the control resource set and the corresponding synchronization signal block are in two adjacent slots, wherein k is a non-negative integer.

12. The apparatus of claim 8, wherein the first subcarrier spacing is $\Delta f=2^{\mu+1}\cdot 15$ kHz and the second subcarrier spacing is $\Delta f=2^{\mu}\cdot 15$ kHz, where u is a non-negative integer, wherein the control resource set period includes two slots, wherein the index of the first symbol of the control resource set includes 0 or 1 in a first slot and 0 or 1 in a second slot, and an index of the corresponding synchronization signal block includes 4k, 4k+1, 4k+2, or 4k+3, the control resource set and the corresponding synchronization signal block being in the same slot, or wherein the index of the first symbol of the control resource set includes 0, 6, or 7 in the first slot, and 0, 6, or 7 in the second slot, and wherein the index of a corresponding synchronization signal block includes 4k, 4k+1, 4k+2, or 4k+3, the control resource set and the corresponding synchronization signal block being in the same slot, or wherein the index of the first symbol of the control resource set includes 0 or 2 in the first slot, and 0 or 2 in the second slot, and wherein the index of the corresponding synchronization signal block includes 4k, 4k+1, 4k+2, or 4k+3, the control resource set and the corresponding synchronization signal block being in the same slot, or wherein the index of the first symbol of the control resource set includes 0 or 6 in the first slot, and 0 or 6 in the second slot, and wherein the index of the corresponding synchronization signal block includes 4k, 4k+1, 4k+2, or 4k+3, the control resource set and the corresponding synchronization signal block being in the same slot, wherein k is a non-negative integer.

13. The apparatus of claim 8, wherein the first subcarrier spacing is $\Delta f=2^{\mu}\cdot 15$ kHz and the second subcarrier spacing is $\Delta f=2^{\mu+1}\cdot 15$ kHz, where u is a non-negative integer, wherein the control resource set period includes four slots, wherein the index of the first symbol of the control resource set includes 0 in a first slot and 0 in a second slot, and an index of the corresponding synchronization signal block includes 4k or 4k+2 when the control resource set and the corresponding synchronization signal block are in the same slot, or wherein the index of the first symbol of the control resource set includes 1 in a third slot and 1 in a fourth slot, and the index of the corresponding synchronization signal block includes 4k+1 or 4k+3 when the control resource set and the corresponding synchronization signal block are in two adjacent slots, or wherein the index of the first symbol of the control resource set includes 0 in the first slot, 0 or 2 in the second slot, 0 in the third slot, and 0 or 2 in the fourth slot, and the index of the corresponding synchronization signal block includes 4k, 4k+1, 4k+2, or 4k+3, the control resource set and the corresponding synchronization signal block being in the same slot, wherein k is a non-negative integer.

14. The apparatus of claim 8, wherein the first subcarrier spacing is $\Delta f=2^{\mu}\cdot 15$ kHz and the second subcarrier spacing is $\Delta f=2^{\mu+1}\cdot 15$ kHz, where u is a non-negative integer, wherein the control resource set period includes two slots, wherein the index of the first symbol of the control resource set includes 0 in a first slot and an index of the corresponding synchronization signal block includes 2k when the control resource set and the corresponding synchronization signal block being in the same slot, or wherein the index of the first symbol of the control resource set includes 1 or 2 in a second slot, and the index of the corresponding synchronization signal block includes 2k+1 when the control resource set and the corresponding synchronization signal block are in different slots, or wherein the index of the first symbol of the control resource set includes 0 in the first slot and 0 in the second slot, and the index of the corresponding synchronization signal block includes 2k or 2k+1, the control resource set and the corresponding synchronization signal block being in the same slot, wherein k is a non-negative integer.

15. A wireless communication method, comprising:

mapping multiple synchronization signal blocks to symbols within a first time interval in which transmissions have a first subcarrier spacing and a first cyclic prefix length;

mapping synchronization data onto the multiple synchronization signal blocks;

mapping multiple control resource sets to symbols within a second time interval in which transmissions have a second subcarrier spacing and a second cyclic prefix length, the second cyclic prefix length being different from the first cyclic prefix length, wherein the multiple control resource sets are configured according to a control resource set period corresponding to number of slots, and wherein each synchronization signal block has a one-to-one correspondence with each set of the multiple control resource sets;

generating a transmission pattern for the first time interval and the second time interval; and performing a transmission according to the transmission pattern, wherein the mapping of the multiple synchronization signal blocks is based on the second cyclic prefix length of the second time interval.

16. The method of claim 15, wherein the first subcarrier spacing is $\Delta f=2^{\mu+2}\cdot 15$ kHz and the second subcarrier spacing is $\Delta f=2^{\mu}\cdot 15$ kHz, where u is a non-negative integer, wherein the control resource set period includes one slot, wherein the multiple control resource sets and the multiple synchronization signal blocks are within the same slot, and wherein an index of a first symbol of a control resource set includes 0, 1, 3, 6, 7, or 10 in the first slot, and wherein an index of a corresponding synchronization signal block includes 6k, 6k+1, 6k+2, 6k+3, 6k+4, or 6k+5, k being a non-negative integer.

17. The method of claim 15, wherein the first subcarrier spacing is $\Delta f=2^{\mu+2}\cdot 15$ kHz and the second subcarrier spacing is $\Delta f=2^{\mu}\cdot 15$ kHz, where u is a non-negative integer, wherein the control resource set period includes one slot, wherein the multiple control resource sets and the multiple synchronization signal blocks are within the same slot, and wherein an index of a first symbol of a control resource set includes 0, 1, 7, or 8 in the slot, and an index of a corresponding synchronization signal block includes 4k, 4k+1, 4k+2, or 4k+3, or wherein an index of a first symbol of a control resource set includes 0, 3, 7, or 10 in the slot, and an index of a corresponding synchronization signal block includes 4k, 4k+1, 4k+2, or 4k+3, k being a non-negative integer.

18. The method of claim 15, wherein the first subcarrier spacing and the second subcarrier spacing are $\Delta f=2^{\mu} \cdot 15$ kHz, where u is a non-negative integer,
   wherein the control resource set period includes one slot,
   wherein the multiple control resource sets and the multiple synchronization signal blocks are within the same slot, and
   wherein an index of a first symbol of a control resource set includes 0 or 1 in the slot, and wherein an index of a corresponding synchronization signal block includes 2k or 2k+1, k being a non-negative integer, or
   wherein an index of a first symbol of a control resource set includes 0 or 6 in the slot, and wherein an index of a corresponding synchronization signal block includes 2k or 2k+1, k being a non-negative integer.

19. The method of claim 15, wherein at least one of the following is satisfied:
   (1) the first subcarrier spacing is $\Delta f=2^{\mu+2} \cdot 15$ kHz and the second subcarrier spacing is $\Delta f=2^{\mu} \cdot 15$ kHz, where u is a non-negative integer,
      wherein the control resource set period includes one slot, the multiple control resource sets and the multiple synchronization signal blocks are within the same slot, and
      wherein an index of a first symbol of a control resource set includes 0, 1, 3, 6, 7, or 10 in the one slot, and an index of a corresponding synchronization signal block includes 6k, 6k+1, 6k+2, 6k+3, 6k+4, or 6k+5, k being a non-negative integer;
   (2) the first subcarrier spacing is $\Delta f=2^{\mu+1} \cdot 15$ kHz and the second subcarrier spacing is $\Delta f=2^{\mu} \cdot 15$ kHz,
      wherein the control resource set period includes two slots,
      wherein an index of a first symbol of a control resource set includes 0, 1, or 2 in a first slot and 0 or 1 in a second slot, and an index of a corresponding synchronization signal block includes 6k, 6k+1, 6k+2, 6k+4, or 6k+5 when the control resource set and the corresponding synchronization signal block are in a same slot, and
      wherein the index of the first symbol of the control resource set includes 13 in the first slot, and the index of the corresponding synchronization signal block includes 6k+3 when the control resource set and the corresponding synchronization signal block are in different slots, k being a non-negative integer;
   (3) the first subcarrier spacing and the second subcarrier spacing are $\Delta f=2^{\mu} \cdot 15$ kHz,
      wherein the control resource set period includes four slots,
      wherein an index of a first symbol of a control resource set includes 0 in a first slot and 0 or 1 in a second slot, and an index of a corresponding synchronization signal block includes 6k, 6k+3, or 6k+4 when the control resource set and the corresponding synchronization signal block are in a same slot, and
      wherein the index of the first symbol of the control resource set includes 1 or 2 in a third slot and 2 in a fourth slot, and the index of the corresponding synchronization signal block includes 6k+1, 6k+2, or 6k+5 when the control resource set and the corresponding synchronization signal block are in two adjacent slots, k being a non-negative integer;
   (4) the first subcarrier spacing is $\Delta f=2^{\mu+2} \cdot 15$ kHz and the second subcarrier spacing is $\Delta f=2^{\mu} \cdot 15$ kHz,
      wherein the control resource set period includes one slot,
      wherein the multiple control resource sets and the multiple synchronization signal blocks are within the same slot, and
      wherein an index of a first symbol of a control resource set includes 0, 1, 7, or 8 in the slot, and an index of a corresponding synchronization signal block includes 4k, 4k+1, 4k+2, or 4k+3, or
      wherein an index of a first symbol of a control resource set includes 0, 3, 7, or 10 in the slot, and an index of a corresponding synchronization signal block includes 4k, 4k+1, 4k+2, or 4k+3, k being a non-negative integer;
   (5) the first subcarrier spacing is $\Delta f=2^{\mu+1} \cdot 15$ kHz and the second subcarrier spacing is $\Delta f=2^{\mu} \cdot 15$ kHz,
      wherein the control resource set period includes two slots, and
      wherein an index of a first symbol of a control resource set includes 0 or 6 in a first slot, and 0 or 6 in a second slot, and wherein an index of a corresponding synchronization signal block includes 4k, 4k+1, 4k+2, or 4k+3, the control resource set and the corresponding synchronization signal block being in a same slot, k being a non-negative integer;
   (6) the first subcarrier spacing and the second subcarrier spacing are $\Delta f=2^{\mu} \cdot 15$ kHz,
      wherein the control resource set period includes four slots,
      wherein an index of a first symbol of a control resource set includes 0 in a first slot and 0 in a second slot, and an index of a corresponding synchronization signal block includes 4k or 4k+2 when the control resource set and the corresponding synchronization signal block are in a same slot, and
      wherein the index of the first symbol of the control resource set includes 1 in a third slot and 1 in a fourth slot, and the index of the corresponding synchronization signal block includes 4k+1 or 4k+3 when the control resource set and the corresponding synchronization signal block are in two adjacent slots, k being a non-negative integer;
   (7) the first subcarrier spacing is $\Delta f=2^{\mu} \cdot 15$ kHz and the second subcarrier spacing is $\Delta f=2^{\mu+1} \cdot 15$ kHz,
      wherein the control resource set period includes four slots, and
      wherein an index of a first symbol of a control resource set includes 0 in a first slot, 0 or 2 in a second slot, 0 in a third slot, and 0 or 2 in a fourth slot, and an index of a corresponding synchronization signal block includes 4k, 4k+1, 4k+2, or 4k+3, the control resource set and the corresponding synchronization signal block being in a same slot, k being a non-negative integer;
   (8) the first subcarrier spacing and the second subcarrier spacing are $\Delta f=2^{\mu} \cdot 15$ kHz,
      wherein the control resource set period includes one slot,
      wherein the multiple control resource sets and the multiple synchronization signal blocks are within the same slot, and
      wherein an index of a first symbol of a control resource set includes 0 or 6 in the slot, and wherein an index of a corresponding synchronization signal block includes 2k or 2k+1, k being a non-negative integer; or (9) the first subcarrier spacing is $\Delta f=2^\mu \cdot 15$ kHz and the second subcarrier spacing is $\Delta f=2^{\mu+1} \cdot 15$ kHz, wherein the control resource set period includes two slots, wherein an index of a first symbol of a control resource set includes 0 in a first slot, and an index of a corresponding synchronization signal block includes 2k when the control resource set and the corresponding synchronization signal block being in a same slot, and wherein the index of the first symbol of the control resource set includes 1 or 2 in a second slot, and the index of the corresponding synchronization signal block includes 2k+1 when the control resource set and the corresponding synchronization signal block are in different slots, k being a non-negative integer.

20. A communication apparatus, comprising:
a processor configured to:
map multiple synchronization signal blocks to symbols within a first time interval in which transmissions have a first subcarrier spacing and a first cyclic prefix length;
map synchronization data onto the multiple synchronization signal blocks;
map multiple control resource sets to symbols within a second time interval in which transmissions have a second subcarrier spacing and a second cyclic prefix length, the second cyclic prefix length being different from the first cyclic prefix length, wherein the multiple control resource sets are configured according to a control resource set period corresponding to number of slots such that at least one slot in the control resource set period has a plurality of control resource sets, and wherein each synchronization signal block has a one-to-one correspondence with each set of the multiple control resource sets;
generate a transmission pattern for the first time interval and the second time interval; and
perform a transmission according to the transmission pattern,
wherein the mapping of the multiple synchronization signal blocks is based on the second cyclic prefix length of the second time interval.

21. The apparatus of claim 20, wherein the first subcarrier spacing is $\Delta f=2^{\mu+2} \cdot 15$ kHz and the second subcarrier spacing is $\Delta f=2^\mu \cdot 15$ kHz, where u is a non-negative integer,
wherein the control resource set period includes one slot,
wherein the multiple control resource sets and the multiple synchronization signal blocks are within the same slot, and
wherein an index of a first symbol of a control resource set includes 0, 1, 3, 6, 7, or 10 in the first slot, and wherein an index of a corresponding synchronization signal block includes 6k, 6k+1, 6k+2, 6k+3, 6k+4, or 6k+5, k being a non-negative integer.

22. The apparatus of claim 20, wherein the first subcarrier spacing is $\Delta f=2^{\mu+2} \cdot 15$ kHz and the second subcarrier spacing is $\Delta f=2^\mu \cdot 15$ kHz, where u is a non-negative integer,
wherein the control resource set period includes one slot,
wherein the multiple control resource sets and the multiple synchronization signal blocks are within the same slot, and
wherein an index of a first symbol of a control resource set includes 0, 1, 7, or 8 in the slot, and an index of a corresponding synchronization signal block includes 4k, 4k+1, 4k+2, or 4k+3, or
wherein an index of a first symbol of a control resource set includes 0, 3, 7, or 10 in the slot, and an index of a corresponding synchronization signal block includes 4k, 4k+1, 4k+2, or 4k+3, k being a non-negative integer.

23. The apparatus of claim 20, wherein the first subcarrier spacing and the second subcarrier spacing are $\Delta f=2^\mu \cdot 15$ kHz, where u is a non-negative integer,
wherein the control resource set period includes one slot,
wherein the multiple control resource sets and the multiple synchronization signal blocks are within the same slot, and
wherein an index of a first symbol of a control resource set includes 0 or 1 in the slot, and wherein an index of a corresponding synchronization signal block includes 2k or 2k+1, k being a non-negative integer, or
wherein an index of a first symbol of a control resource set includes 0 or 6 in the slot, and wherein an index of a corresponding synchronization signal block includes 2k or 2k+1, k being a non-negative integer.

24. The apparatus of claim 20, wherein at least one of the following is satisfied:
(1) the first subcarrier spacing is $\Delta f=2^{\mu+2} \cdot 15$ kHz and the second subcarrier spacing is $\Delta f=2^\mu \cdot 15$ kHz, where u is a non-negative integer,
wherein the control resource set period includes one slot, the multiple control resource sets and the multiple synchronization signal blocks are within the same slot, and
wherein an index of a first symbol of a control resource set includes 0, 1, 3, 6, 7, or 10 in the one slot, and an index of a corresponding synchronization signal block includes 6k, 6k+1, 6k+2, 6k+3, 6k+4, or 6k+5, k being a non-negative integer;
(2) the first subcarrier spacing is $\Delta f=2^{\mu+1} \cdot 15$ kHz and the second subcarrier spacing is $\Delta f=2^\mu \cdot 15$ kHz,
wherein the control resource set period includes two slots,
wherein an index of a first symbol of a control resource set includes 0, 1, or 2 in a first slot and 0 or 1 in a second slot, and an index of a corresponding synchronization signal block includes 6k, 6k+1, 6k+2, 6k+4, or 6k+5 when the control resource set and the corresponding synchronization signal block are in a same slot, and
wherein the index of the first symbol of the control resource set includes 13 in the first slot, and the index of the corresponding synchronization signal block includes 6k+3 when the control resource set and the corresponding synchronization signal block are in different slots, k being a non-negative integer;
(3) the first subcarrier spacing and the second subcarrier spacing are $\Delta f=2^\mu \cdot 15$ kHz,
wherein the control resource set period includes four slots,
wherein an index of a first symbol of a control resource set includes 0 in a first slot and 0 or 1 in a second slot, and an index of a corresponding synchronization signal block includes 6k, 6k+3, or 6k+4 when the control resource set and the corresponding synchronization signal block are in a same slot, and
wherein the index of the first symbol of the control resource set includes 1 or 2 in a third slot and 2 in a fourth slot, and the index of the corresponding synchronization signal block includes 6k+1, 6k+2, or 6k+5 when the control resource set and the corresponding synchronization signal block are in two adjacent slots, k being a non-negative integer;

(4) the first subcarrier spacing is $\Delta f=2^{\mu+2}\cdot 15$ kHz and the second subcarrier spacing is $\Delta f=2^{\mu}\cdot 15$ kHz,
   wherein the control resource set period includes one slot,
   wherein the multiple control resource sets and the multiple synchronization signal blocks are within the same slot, and
   wherein an index of a first symbol of a control resource set includes 0, 1, 7, or 8 in the slot, and an index of a corresponding synchronization signal block includes 4k, 4k+1, 4k+2, or 4k+3, or
   wherein an index of a first symbol of a control resource set includes 0, 3, 7, or 10 in the slot, and an index of a corresponding synchronization signal block includes 4k, 4k+1, 4k+2, or 4k+3, k being a non-negative integer;

(5) the first subcarrier spacing is $\Delta f=2^{\mu+1}\cdot 15$ kHz and the second subcarrier spacing is $\Delta f=2^{\mu}\cdot 15$ kHz,
   wherein the control resource set period includes two slots, and
   wherein an index of a first symbol of a control resource set includes 0 or 6 in a first slot, and 0 or 6 in a second slot, and wherein an index of a corresponding synchronization signal block includes 4k, 4k+1, 4k+2, or 4k+3, the control resource set and the corresponding synchronization signal block being in a same slot, k being a non-negative integer;

(6) the first subcarrier spacing and the second subcarrier spacing are $\Delta f=2^{\mu}\cdot 15$ kHz,
   wherein the control resource set period includes four slots,
   wherein an index of a first symbol of a control resource set includes 0 in a first slot and 0 in a second slot, and an index of a corresponding synchronization signal block includes 4k or 4k+2 when the control resource set and the corresponding synchronization signal block are in a same slot, and
   wherein the index of the first symbol of the control resource set includes 1 in a third slot and 1 in a fourth slot, and the index of the corresponding synchronization signal block includes 4k+1 or 4k+3 when the control resource set and the corresponding synchronization signal block are in two adjacent slots, k being a non-negative integer;

(7) the first subcarrier spacing is $\Delta f=2^{\mu}\cdot 15$ kHz and the second subcarrier spacing is $\Delta f=2^{\mu+1}\cdot 15$ kHz,
   wherein the control resource set period includes four slots, and
   wherein an index of a first symbol of a control resource set includes 0 in a first slot, 0 or 2 in a second slot, 0 in a third slot, and 0 or 2 in a fourth slot, and an index of a corresponding synchronization signal block includes 4k, 4k+1, 4k+2, or 4k+3, the control resource set and the corresponding synchronization signal block being in a same slot, k being a non-negative integer;

(8) the first subcarrier spacing and the second subcarrier spacing are $\Delta f=2^{\mu}\cdot 15$ kHz,
   wherein the control resource set period includes one slot,
   wherein the multiple control resource sets and the multiple synchronization signal blocks are within the same slot, and
   wherein an index of a first symbol of a control resource set includes 0 or 6 in the slot, and wherein an index of a corresponding synchronization signal block includes 2k or 2k+1, k being a non-negative integer; or (9) the first subcarrier spacing is $\Delta f=2^{\mu}\cdot 15$ kHz and the second subcarrier spacing is $\Delta f=2^{\mu+1}\cdot 15$ kHz,
   wherein the control resource set period includes two slots,
   wherein an index of a first symbol of a control resource set includes 0 in a first slot, and an index of a corresponding synchronization signal block includes 2k when the control resource set and the corresponding synchronization signal block being in a same slot, and
   wherein the index of the first symbol of the control resource set includes 1 or 2 in a second slot, and the index of the corresponding synchronization signal block includes 2k+1 when the control resource set and the corresponding synchronization signal block are in different slots, k being a non-negative integer.

* * * * *